US010906234B2

(12) United States Patent
Murao et al.

(10) Patent No.: US 10,906,234 B2
(45) Date of Patent: Feb. 2, 2021

(54) METHOD OF PRODUCING THREE-DIMENSIONALLY SHAPED OBJECT AND THREE-DIMENSIONAL SHAPING APPARATUS

(71) Applicant: CANON KABUSHIKI KAISHA, Tokyo (JP)

(72) Inventors: Hitoshi Murao, Tokyo (JP); Yoshiyuki Beniya, Abiko (JP); Kiyoshi Yamamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 472 days.

(21) Appl. No.: 15/782,955

(22) Filed: Oct. 13, 2017

(65) Prior Publication Data

US 2018/0111313 A1 Apr. 26, 2018

(30) Foreign Application Priority Data

| Oct. 26, 2016 | (JP) | 2016-209782 |
| Nov. 21, 2016 | (JP) | 2016-226042 |
| Aug. 10, 2017 | (JP) | 2017-156168 |

(51) Int. Cl.
*B29C 64/112* (2017.01)
*B29C 64/118* (2017.01)
(Continued)

(52) U.S. Cl.
CPC .......... *B29C 64/118* (2017.08); *B29C 64/112* (2017.08); *B29C 64/209* (2017.08);
(Continued)

(58) Field of Classification Search
CPC ... B29C 64/106; B29C 64/112; B29C 64/118; B29C 64/124; B29C 64/129;
(Continued)

(56) References Cited

U.S. PATENT DOCUMENTS 2,047,580 A * 7/1936 Dewey ................... B67D 7/421
141/285
5,260,009 A * 11/1993 Penn ...................... H05K 3/125
264/401
(Continued)

FOREIGN PATENT DOCUMENTS

CN 103231513 A 8/2013
EP 3020649 A1 * 5/2016 ......... B65D 47/2068
(Continued)

OTHER PUBLICATIONS

First Office Action in Chinese Application No. 201711004543.0 (dated Oct. 30, 2019).
(Continued)

*Primary Examiner* — Atul P. Khare
(74) *Attorney, Agent, or Firm* — Venable LLP

(57) ABSTRACT

A three-dimensional shaping apparatus includes an ejection portion, a base stage, a movement portion, and a controller. The ejection portion configured to eject a fused thermoplastic resin. The movement portion configured to change relative positions of the ejection portion and the base stage. The controller configured to control the movement portion and the ejection portion such that a wall is formed by ejecting a fused thermoplastic resin from the ejection portion while relatively moving the ejection portion with respect to the base stage to provide a space surrounded by the wall in a horizontal direction and open in an upward direction, and such that a filling portion is formed by injecting a fused thermoplastic resin into the space from above.

12 Claims, 25 Drawing Sheets

(51) Int. Cl.
  *B29C 64/209* (2017.01)
  *B29C 64/236* (2017.01)
  *B33Y 30/00* (2015.01)
  *B29C 64/25* (2017.01)
  *B33Y 10/00* (2015.01)
  *B29C 64/393* (2017.01)
  *B29C 64/245* (2017.01)
  *B33Y 50/02* (2015.01)

(52) U.S. Cl.
  CPC ............ *B29C 64/236* (2017.08); *B29C 64/25* (2017.08); *B33Y 10/00* (2014.12); *B33Y 30/00* (2014.12); *B29C 64/245* (2017.08); *B29C 64/393* (2017.08); *B29K 2995/0077* (2013.01); *B33Y 50/02* (2014.12)

(58) Field of Classification Search
  CPC ... B29C 64/135; B29C 64/171; B29C 64/176; B29C 64/182; B29C 64/188; B29C 64/194; B29C 64/209
  See application file for complete search history.

(56) References Cited

U.S. PATENT DOCUMENTS

| | | | | |
|---|---|---|---|---|
| 5,529,471 | A * | 6/1996 | Khoshevis | B29C 41/36 425/112 |
| 7,153,454 | B2 * | 12/2006 | Khoshnevis | B29C 64/106 264/34 |
| 7,625,512 | B2 * | 12/2009 | Cruz-Uribe | B41J 25/308 264/308 |
| 7,874,825 | B2 * | 1/2011 | Khoshnevis | B28B 3/2636 425/114 |
| 9,149,988 | B2 * | 10/2015 | Mark | B29C 64/118 |
| 9,227,365 | B2 * | 1/2016 | Dikovsky | B29C 64/135 |
| 9,566,742 | B2 * | 2/2017 | Keating | B29C 64/227 |
| 9,937,666 | B2 * | 4/2018 | Hadas | B29C 64/393 |
| 9,999,509 | B2 * | 6/2018 | Dikovsky | B33Y 50/00 |
| 10,160,193 | B2 * | 12/2018 | Nielsen-Cole | B29C 64/194 |
| 2009/0295032 | A1 | 12/2009 | Hopkins | |
| 2015/0039113 | A1 | 2/2015 | Kaneda | |
| 2015/0352790 | A1 | 12/2015 | Hadas | |
| 2016/0136885 | A1 | 5/2016 | Nielsen-Cole et al. | |
| 2017/0120517 | A1 | 5/2017 | Shimoyama | |
| 2018/0117834 | A1 | 5/2018 | Murao | |
| 2018/0339818 | A1 * | 11/2018 | Matsumoto | B65D 47/2068 |

FOREIGN PATENT DOCUMENTS

| | | |
|---|---|---|
| JP | 2007-531641 A | 11/2007 |
| JP | 2010-521339 A | 6/2010 |
| JP | 2015-030211 A | 2/2015 |
| JP | 2015-178191 A | 10/2015 |
| JP | 2015-189024 A | 11/2015 |
| WO | 2005/009723 A1 | 2/2005 |
| WO | 2008/112061 A1 | 9/2008 |

OTHER PUBLICATIONS

Notification of Reason for Refusal in Japanese Application No. 2017-156168 (dated Oct. 30, 2018).
Murao, U.S. Appl. No. 15/786,826, filed Oct. 18, 2017.

* cited by examiner

METHOD OF PRODUCING THREE-DIMENSIONALLY SHAPED OBJECT AND THREE-DIMENSIONAL SHAPING APPARATUS

BACKGROUND OF THE INVENTION

Field of the Invention

The present invention relates to a method of producing a three-dimensionally shaped object by fusing a resin and ejecting and depositing the fused resin through an ejection port and to a three-dimensional shaping apparatus used therefor. More specifically, the present invention relates to a technique of improving mechanical strength while retaining a high precision of shape of a three-dimensionally shaped object formed via fused deposition modeling.

Description of the Related Art

In recent years, so-called 3D printers have been actively developed, and various methods have been attempted. For example, methods such as fused deposition modeling, stereolithography using photocurable resin, and selective laser sintering are known.

Fused deposition modeling is a method of forming a three-dimensional object by ejecting heated thermoplastic resin through, for example, a nozzle, and depositing the thermoplastic resin. This method is simple in principle, and thus has a merit that this method can be performed by a small apparatus at relatively low cost.

For example, Japanese Patent Laid-Open (Translation of PCT Application) No. 2010-521339 discloses a method of forming a three-dimensionally shaped object by fusing a modified acrylonitrile-butadiene-styrene copolymer material: modified ABS material, extruding the modified ABS material by an extruding head, and depositing the modified ABS material layer by layer.

In addition, Japanese Patent Laid-Open No. 2015-189024 discloses, in relation to fused deposition modeling using a resin material, a method of, after forming one or plural unit layers and before starting formation of a next unit layer, polishing the surface of the one or plural unit layers and performing electric discharge treatment.

In the fused deposition modeling of Japanese Patent Laid-Open (Translation of PCT Application) No. 2010-521339, the fused resin is extruded as a columnar highly-viscous fluid having a sectional shape according to an opening of the extruding head, and a pattern is formed by relatively scanning the fused resin that is extruded with respect to a base stage. When the fused resin that is extruded comes into contact with resin of a lower layer that has already solidified, the temperature thereof is reduced and the viscosity thereof further increases. Therefore, there is a case where the upper surface of the pattern does not become flat and has a shape corresponding to the sectional shape of the columnar fluid. In this case, when depositing a next layer, the next layer is deposited on a base layer that is not flat, and thus there is a higher possibility that a gap occurs between the base layer and the next layer. In the case where there is an inter-layer gap, there is a risk that the mechanical strength of the three-dimensionally shaped object becomes insufficient.

In the fused deposition modeling of Japanese Patent Laid-Open No. 2015-189024, a next layer is formed after depositing a lower layer, polishing and flattening the surface, and performing electric discharge treatment. By performing the surface polishing and electrical discharge, unevenness of the surface of the lower layer can be reduced. However, the thickness of each layer is reduced by the polishing, and thus the time required for three-dimensional shaping and the amount of consumption of resin material increase. In addition, in the case where the thickness of resin removed by the polishing is not considered, the precision of the shape of the three-dimensionally shaped object in the height direction decreases. In addition, the temperature of the layer is reduced while performing the polishing and electrical discharge, and thus there is a risk that the adhesion between the layer and the next layer decreases and the strength of the three-dimensionally shaped object decreases. Further, since a mechanism for the polishing and electrical discharge is provided, there is a problem that, for example, the shaping apparatus becomes larger.

SUMMARY OF THE INVENTION

According to a first aspect of the present invention, a method of producing a three-dimensionally shaped object by ejecting, from an ejection portion, and depositing, on a base stage, a fused thermoplastic resin, includes a wall formation step of forming a wall by ejecting a fused thermoplastic resin while relatively moving the ejection portion with respect to the base stage to provide a space surrounded by the wall in a horizontal direction and open in an upward direction, and an injection step of ejecting a fused thermoplastic resin from above the space to inject a fused thermoplastic resin into the space.

According to a second aspect of the present invention, a three-dimensional shaping apparatus includes an ejection portion configured to eject a fused thermoplastic resin, a base stage, a movement portion configured to change relative positions of the ejection portion and the base stage, and a controller configured to control the movement portion and the ejection portion such that a wall is formed by ejecting a fused thermoplastic resin from the ejection portion while relatively moving the ejection portion with respect to the base stage to provide a space surrounded by the wall in a horizontal direction and open in an upward direction, and such that a filling portion is formed by injecting a fused thermoplastic resin into the space from above.

Further features of the present invention will become apparent from the following description of exemplary embodiments with reference to the attached drawings. The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Exemplary embodiments of a method of producing a three-dimensionally shaped object and a three-dimensional shaping apparatus of the present invention will be described below with reference to drawings. To be noted, in the description below, the term "layer" refers to a part deposited in one time of application in the case of applying a fused thermoplastic resin plural times to deposit the thermoplastic resin in a thickness direction. In the case of applying and depositing a thermoplastic resin while relatively scanning an ejection head with respect to a stage, the term "layer" refers to a part applied in one scanning. There are some cases where boundaries between layers can be observed in sectional observation or the like of the three-dimensionally shaped object, and there are some cases where no clear boundary is detected between layers when, for example, the uniformity of the thermoplastic resin is high.

First Exemplary Embodiment

A configuration of a three-dimensional shaping apparatus and a three-dimensional shaping method according to a first exemplary embodiment of the present invention will be described in this order.

Configuration of Apparatus

Figure 1:
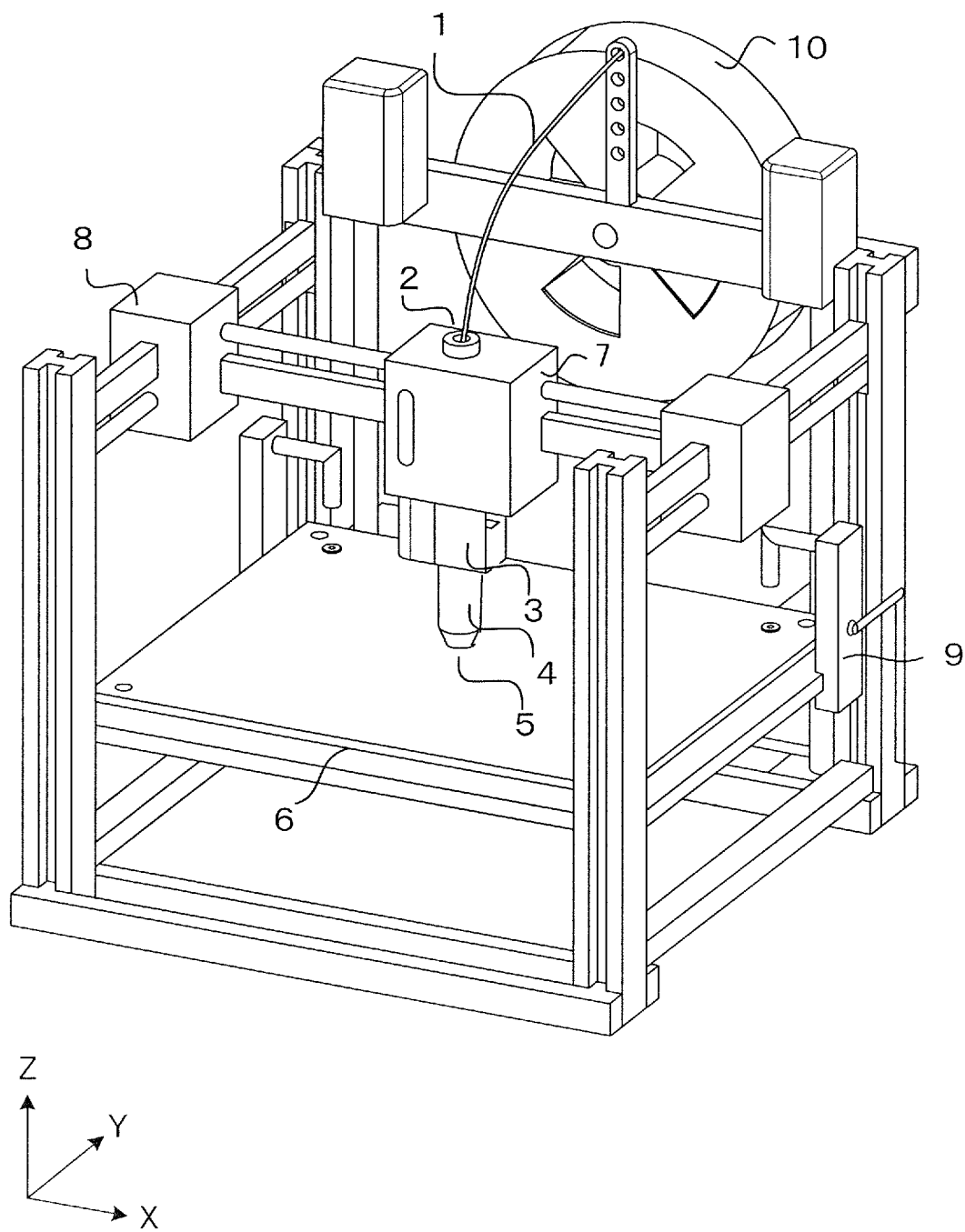
FIG. 1 is a perspective view of a three-dimensional shaping apparatus of a first exemplary embodiment.

FIG. 1 is a schematic perspective view of the three-dimensional shaping apparatus according to the first exemplary embodiment of the present invention.

The three-dimensional shaping apparatus includes a material introduction portion 2, a heating supplying portion 3, an ejection nozzle 4, an ejection port 5, a stage 6, an X movement mechanism 7, a Y movement mechanism 8, a Z movement mechanism 9, and a reel 10, and a shaping material 1 is set in the material introduction portion 2.

The shaping material 1 is a raw material used for three-dimensional shaping. Although a thermoplastic resin shaped into a filament is used as the shaping material 1 in the present exemplary embodiment, a material of another shape such as a pellet or powder may be also used.

The filament used as the shaping material 1 preferably has, for example, a circular sectional shape, a diameter of 1.5 mm to 3.0 mm, and a length of 10 m to 1000 m. The shaping material 1 is stored by being wound up around the reel 10. The shaping material 1 can be supplied to the material introduction portion 2 by rotating the reel 10.

Examples of the thermoplastic resin that can be used in the present exemplary embodiment include polycarbonate: PC resin, acrylonitrile-butadiene-styrene copolymer: ABS resin, PC/ABS polymer alloy, polylactic acid: PLA resin, polyphenylene sulfide: PPS resin, polyetherimide: PEI resin, polyethylene terephthalate: PET resin, and modified resins of these.

Figure 2:
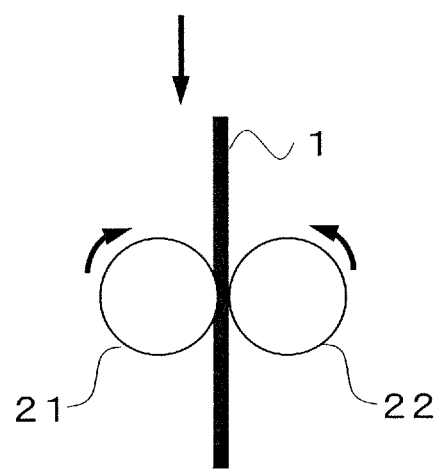
FIG. 2 illustrates a resin feeding mechanism of embodiments.

The heating supplying portion 3 takes in the thermoplastic resin serving as the shaping material 1, heats the shaping material 1 to a glass transition temperature Tg or higher to fuse the thermoplastic resin, and then supplies the thermoplastic resin to the ejection nozzle 4. FIG. 2 illustrates a feeding mechanism included in the heating supplying portion 3.

As illustrated in FIG. 2, the feeding mechanism includes rollers 21 and 22 for taking in the filament-shaped shaping material 1 and sending the shaping material 1 to a heating portion. The shaping material 1 is nipped by the rollers 21 and 22, and can be pulled in from the reel 10 and sent into the heating portion by rotating the rollers 21 and 22 in directions indicated by arrows in FIG. 2.

The heating portion that is not illustrated heats and fuses the thermoplastic resin supplied from the feeding mechanism. The heating portion includes a heater, and can adjust the temperature of the fused resin by controlling the amount of heat generated by the heater.

The thermoplastic resin in a fused state is sent into the ejection nozzle 4 by being pushed by a succeeding material. The thermoplastic resin pushed to the distal end portion of the ejection nozzle 4 is ejected through the ejection port 5.

By rotating and stopping the rollers 21 and 22, the fused resin can be ejected through and not ejected through the ejection port 5. In addition, by controlling the rotation speed of the rollers 21 and 22, the amount of supply of the shaping material 1 to the heating portion can be adjusted. Accordingly, by controlling the rotation speed of the rollers 21 and 22, the ejection speed, ejection amount, and ejection pressure of the fused resin through the ejection port 5 can be controlled.

The stage 6 is a base stage for supporting a three-dimensionally shaped object being shaped on an upper surface thereof. The upper surface of the stage 6 is parallel to an X-Y plane defined by X and Y axes of the coordinate system in FIG. 2. In addition, a direction perpendicular to the X-Y plane is set as a Z direction.

The three-dimensional shaping apparatus of the present exemplary embodiment can form a three-dimensionally shaped object by ejecting and depositing a thermoplastic resin while changing the relative position of the ejection nozzle 4 with respect to the stage 6. In the apparatus of FIG. 1, the stage 6 can be moved along a Z axis by the Z movement mechanism 9. In addition, the ejection nozzle 4 can be moved along the X-Y plane by the X movement mechanism 7 and the Y movement mechanism 8. The configuration of the apparatus is not necessarily limited to the example of FIG. 1 as long as the ejection nozzle 4 can be relatively moved in the three directions of the X, Y, and Z directions with respect to the stage 6. For example, a configuration in which a stage is fixed and an ejection nozzle can be moved in the three directions of the X, Y, and Z directions may be employed.

To be noted, in the present exemplary embodiment, there is a case where, when forming a filling portion, the bottom surface of the ejection nozzle 4 is brought into contact with an upper surface of a framework portion that has already been formed as will be described later. In the case of simply bringing the ejection nozzle 4 into contact with the upper surface, the position of the stage 6 in the Z direction is controlled by the Z movement mechanism 9. For example, the position of the stage 6 in the Z direction may be controlled to the position of the upper surface of the framework portion with the position of the bottom surface of the ejection nozzle 4 by referring to a designed value of the thickness of the deposited framework portion. Alternatively, a digital camera capable of observing the relative positions of the upper surface of the framework portion and the bottom surface of the ejection nozzle 4 may be provided, and the position of the stage 6 in the Z direction may be controlled on the basis of image recognition. Meanwhile, in the case where it is desired that the bottom surface of the ejection nozzle 4 is in contact with the upper surface of the framework portion while applying a predetermined contact pressure to the upper surface of the framework portion, the Z movement mechanism 9 is operated via a method combining position control and force control. For example, the Z movement mechanism 9 may be provided with a force sensor capable of detecting an external force applied in the Z direction, and a driving portion of the Z movement mechanism 9 may be controlled such that a predetermined contact pressure is applied between the upper surface of the framework portion and the bottom surface of the ejection nozzle 4.

Control Block

Figure 3:
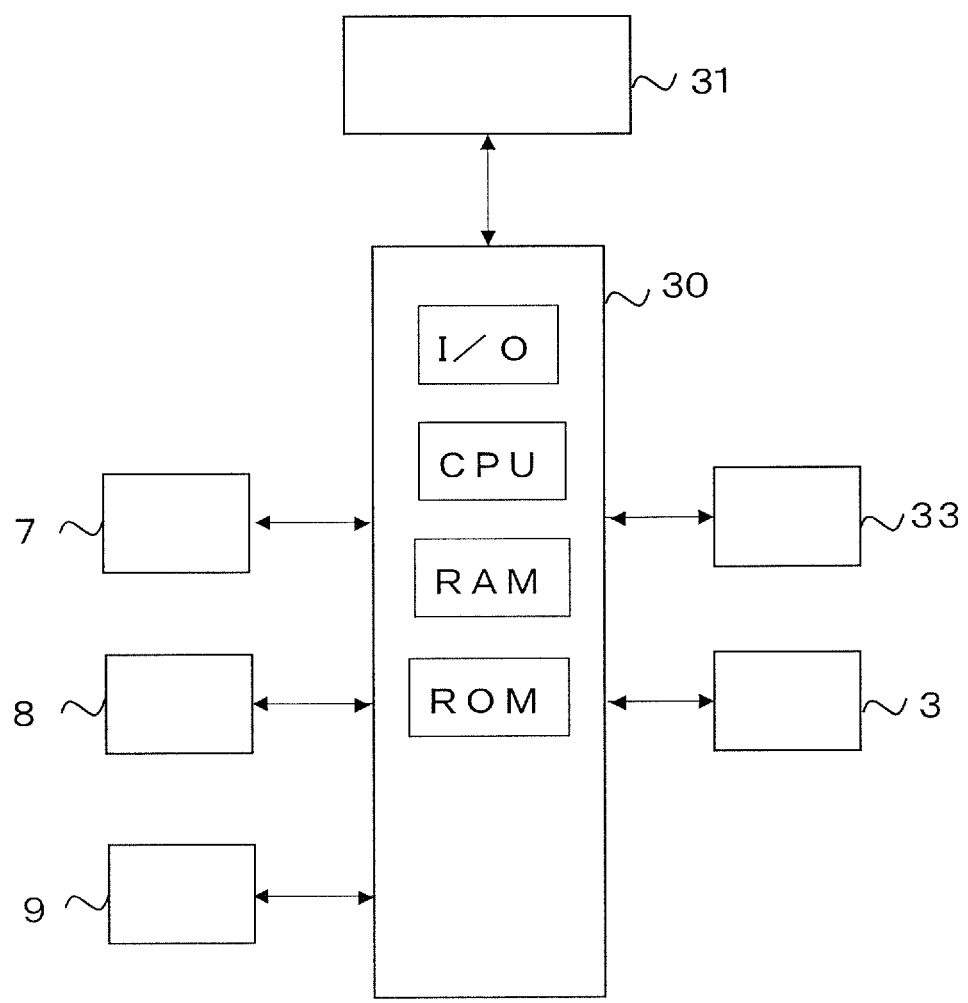
FIG. 3 illustrates control blocks of embodiments.

FIG. 3 briefly illustrates control blocks of the three-dimensional shaping apparatus of the present exemplary embodiment.

A controller 30 is a control circuit for controlling operation of each component of the three-dimensional shaping apparatus. The controller 30 includes a central processing unit: CPU, a read-only memory: ROM, a random access memory: RAM, an input/output port: I/O port, and so forth. The ROM is a nonvolatile memory that stores a control program and a table of values for control. The RAM is a volatile memory used for computation and the like. The I/O port is used for communication with the outside and with components inside the apparatus. To be noted, the ROM stores a program for controlling a basic operation of the three-dimensional shaping apparatus.

A computer 31 is an electronic computer provided with a CPU, a storage device, and an input/output device, and is capable of executing three-dimensional shape editing software. The computer 31 is capable of constructing a framework portion model and a filling portion model suitable for formation using an ejection head on the basis of three-dimensional model information of a three-dimensionally shaped object to be formed and giving an instruction for forming patterns sequentially to the controller 30. The computer 31 may be a computer included in the three-dimensional shaping apparatus and may be an external computer capable of connecting to the three-dimensional shaping apparatus via a network or the like. In addition, the functions of the controller 30 and the computer 31 may be implemented by one computer, and the one computer may be regarded as a single controller.

An operation panel 33 is provided for a user that uses the three-dimensional shaping apparatus. The operation panel 33 includes an input portion for an operator of the three-dimensional shaping apparatus to give an instruction to the apparatus, and a display portion for displaying information to the operator. The input portion includes a keyboard and operation buttons. The display portion includes a display panel that displays an operation state of the three-dimensional shaping apparatus and so forth.

The controller 30 performs each step of three-dimensional shaping by controlling each component of the three-dimensional shaping apparatus on the basis of an instruction from the user input through the operation panel 33. Specifically, when the controller 30 receives an instruction of starting three-dimensional shaping, the controller 30 transmits a control signal to the heating supplying portion 3 to control driving of the rollers 21 and 22 and the heater, and thereby adjusts the supply of fused thermoplastic resin to the ejection nozzle 4. The controller 30 controls the X movement mechanism 7, the Y movement mechanism 8, and the Z movement mechanism 9 to control the relative positions of the ejection nozzle 4 and the stage 6, and thus executes formation of the framework portion and the filling portion in a three-dimensional shaping process.

Three-Dimensional Shaping Process

Figure 4:
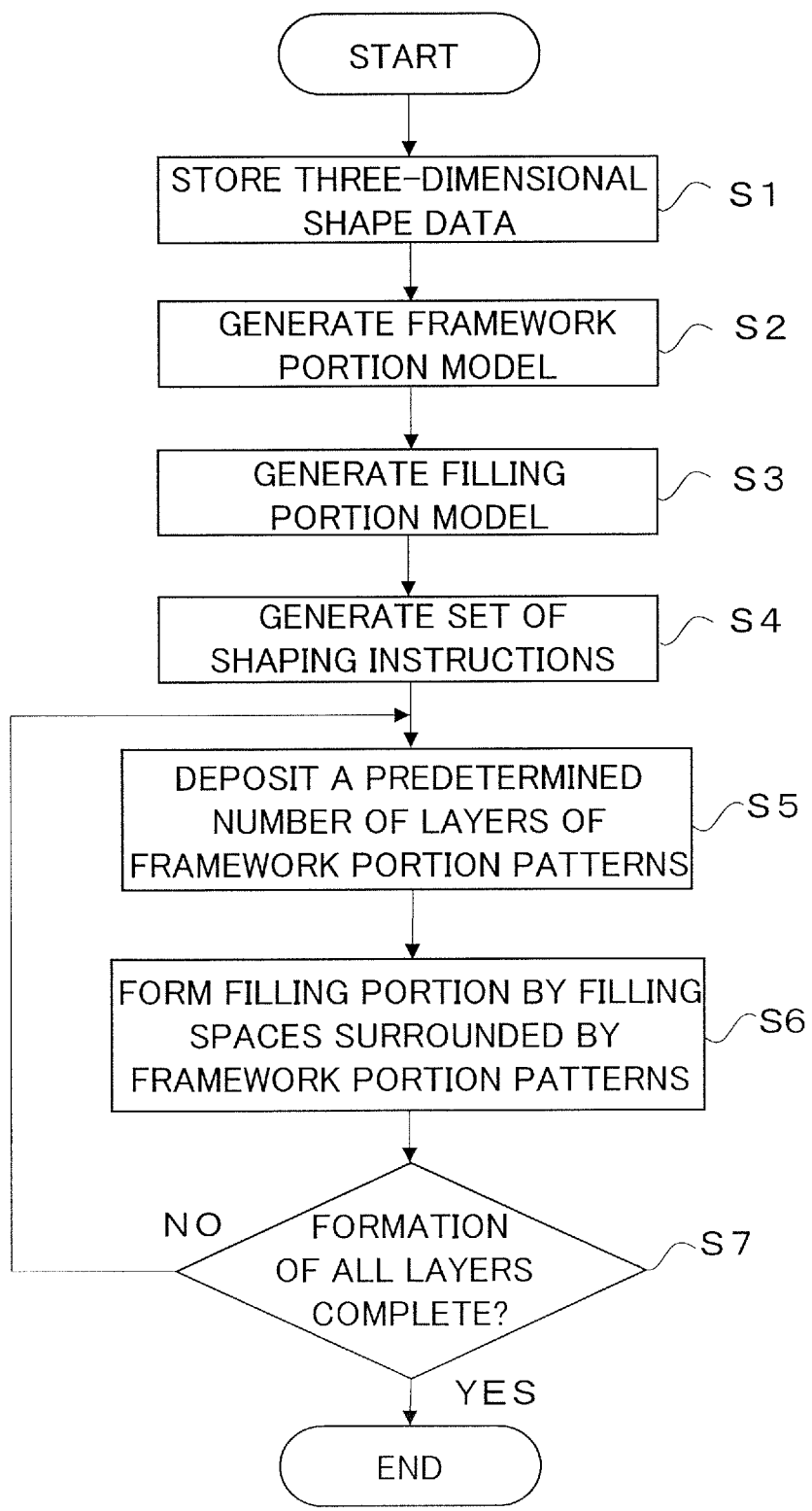
FIG. 4 is a flowchart illustrating a three-dimensional shaping process.

Next, a three-dimensional shaping process of the present exemplary embodiment will be described step by step. FIG. 4 is a flowchart illustrating the order of steps in the three-dimensional shaping process of the present exemplary embodiment.

First, in step S1, three-dimensional shape data is stored in a memory of the computer 31 as three-dimensional shaping model information. The three-dimensional shape data may be data generated by the computer 31, and may be data generated by a computer-aided design: CAD system or a three-dimensional shape measurement apparatus and input via a network or a recording medium. Although a standard for the exchange of product data: STEP format, a parasolid format, a standard triangulated language: STL format, or the like is used as the format of the three-dimensional shape data, the kind of the format is not limited as long as the three-dimensional shape can be expressed as digital data.

In subsequent steps S2 and S3, the computer 31 generates a framework portion model and a filling portion model by using a built-in computational device and three-dimensional shape editing software.

Here, the framework portion model is a model of a partition wall structure that divides a three-dimensional model to be shaped into plural sections. The framework model includes an outer shell portion serving as an outer surface of the three-dimensional model to be shaped. The computer 31 generates the framework portion model in consideration of the width of a pattern and the thickness of one layer that can be formed by the three-dimensional shaping apparatus of the present exemplary embodiment.

In addition, the filling portion model is a shape model of inner spaces of the sections divided by the partition wall structure of the framework portion model. That is, the three-dimensional model to be shaped is completed by the combination of the framework portion model and the filling portion model.

Figure 5A:
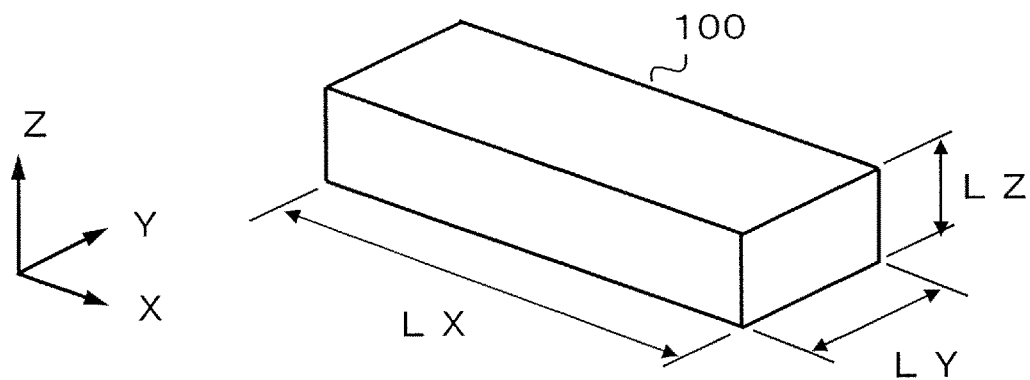
FIG. 5A is a perspective view of a three-dimensional model illustrating a shape thereof.

Here, description will be given by taking a case where the three-dimensional model stored in the computer 31 in step S1 is a three-dimensional model 100 of a rectangular parallelepiped the lengths of whose sides are respectively LX, LY, and LZ as illustrated in FIG. 5A as an example. Although a simple rectangular parallelepiped is shown as an example for the convenience of description, there will be no problem if the three-dimensional model 100 has a more complicated shape than this.

Figure 5B:
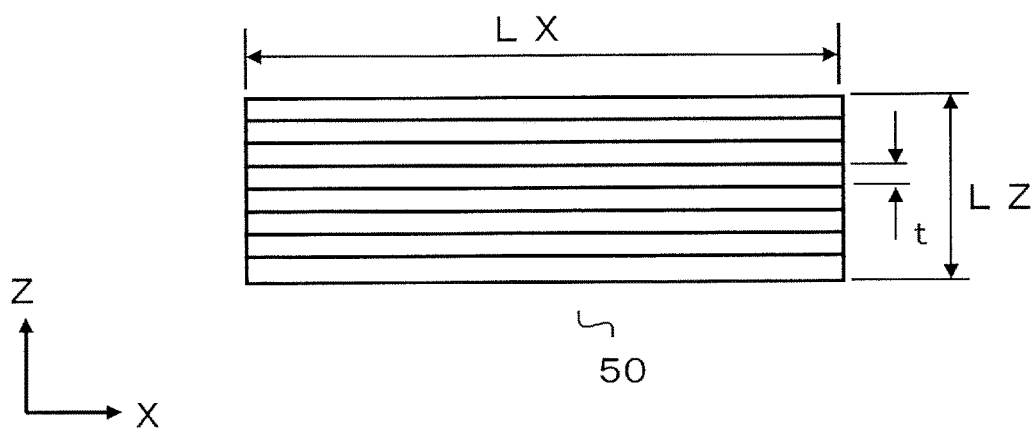
FIG. 5B is a front view of a framework portion model of embodiments.

As described above, the computer 31 generates a framework portion model in step S2. FIG. 5B is a front view of a framework portion model 50 serving as an example of the framework portion model, and FIG. 5C is a plan view of the framework portion model 50.

As illustrated in FIG. 5B, the framework portion model 50 has a multilayer structure in which unit layers each having a thickness t that can be formed by the three-dimensional shaping apparatus of the present exemplary embodiment are piled up in a height direction, that is, a deposition direction in the three-dimensional shaping process. That is, a framework portion model having an eight-layer structure formed on the basis of a shaping model of a height LZ is shown in the example of FIG. 5B.

Figure 5C:
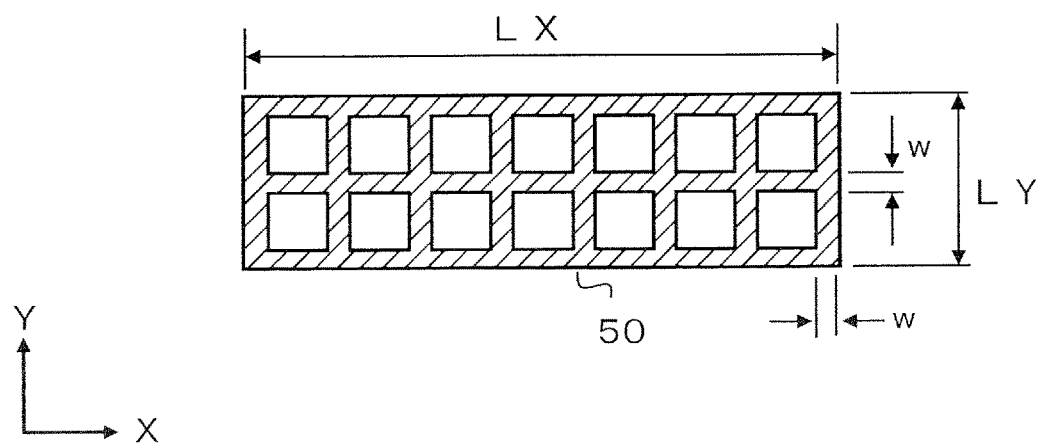
FIG. 5C is a plan view of the framework portion model of embodiments.

Each layer of the framework portion model 50 has a planar shape illustrated in FIG. 5C. For the sake of convenience of illustration, the part corresponding to the framework portion model 50 is indicated by shading. The framework portion model includes an outer shell portion serving as four side surfaces of the three-dimensional model 100, and has a partition wall structure that divides the three-dimensional model 100 into fourteen sections. The width w of the outer shell portion and the partition walls is preferably equal to or an integer multiple of the width of a line that can be formed by the three-dimensional shaping apparatus of the present exemplary embodiment.

Figure 7A:
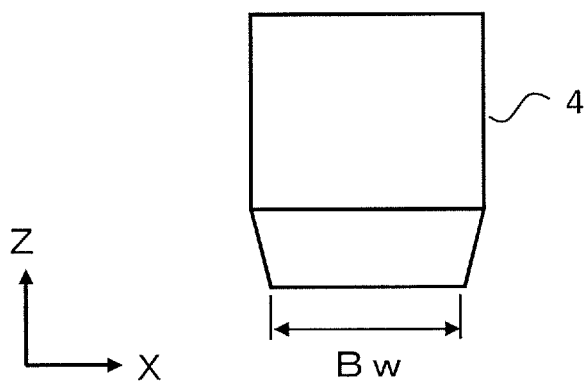
FIG. 7A is a front view of an ejection nozzle of embodiments.
Figure 7B:
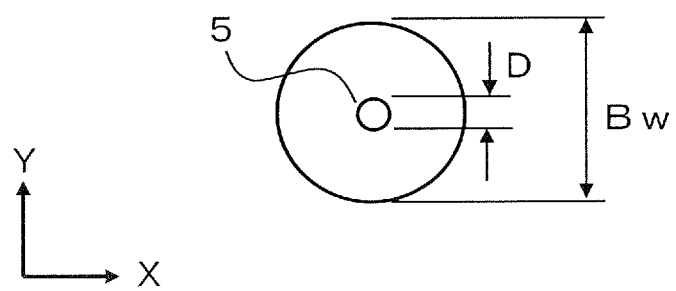
FIG. 7B is a bottom view of the ejection nozzle of embodiments.

For example, it is assumed that the ejection nozzle 4 of the three-dimensional shaping apparatus of the present exemplary embodiment has a shape illustrated in a side view of FIG. 7A and a bottom view of FIG. 7B. As illustrated, a distal end portion of the ejection nozzle 4 is a circular flat surface having a diameter Bw, and the ejection port 5 having a circular shape and an inner diameter D is provided at the center thereof. The width of a line that can be formed with this ejection nozzle is approximately equal to the inner diameter D of the ejection port 5. Of course, the width of a line may be determined more strictly in consideration of the viscosity of the fused resin, the pressure of ejection, the scanning speed of the ejection nozzle 4, and so forth. However, it is anyway preferable that the width w of the outer shell portion and partition walls of the framework portion model is equal to or an integer multiple of the width of a line that can be formed by the three-dimensional shaping apparatus.

Figure 6A:
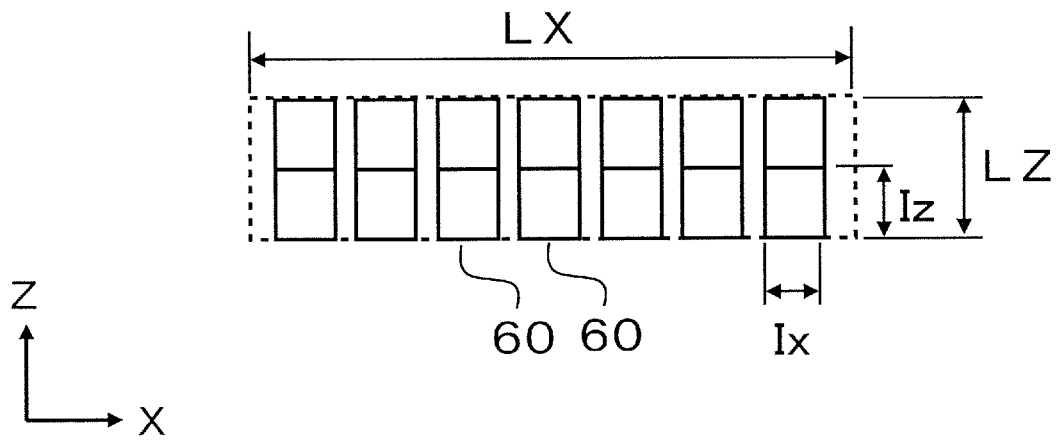
FIG. 6A is a front view of a filling portion model of embodiments.
Figure 6B:
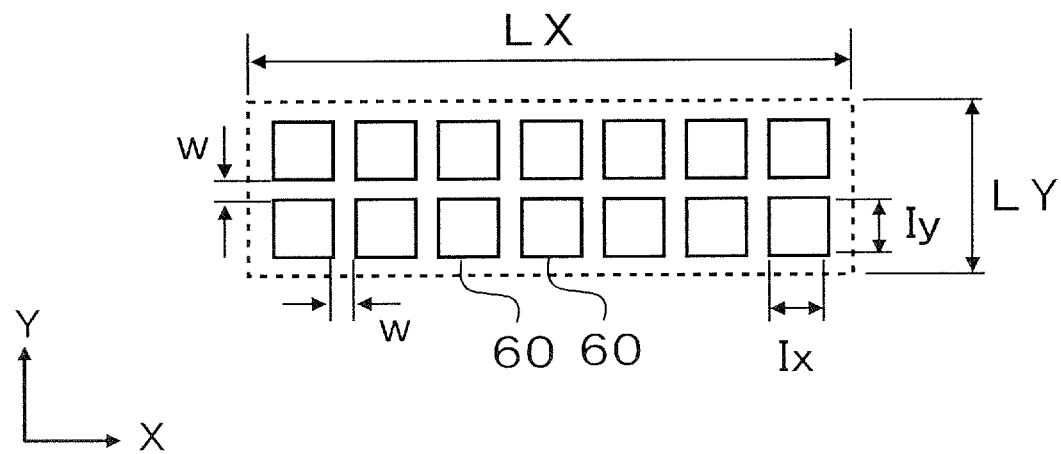
FIG. 6B is a plan view of the filling portion model of embodiments.

Next, in step S3, the computer 31 generates a filling portion model. FIG. 6A is a front view of a filling portion model 60 serving as an example of the filling portion model, and FIG. 6B is a plan view of the filling portion model 60. For the sake of convenience of illustration, the outline of the three-dimensional model 100 is indicated by a dotted line.

As illustrated in FIG. 6A, the filling portion model 60 has a structure in which unit layers each having a thickness that is an integer multiple of a thickness t that can be formed by the three-dimensional shaping apparatus of the present exemplary embodiment are piled up in the height direction, that is, the deposition direction in the three-dimensional shaping process. That is, the filling portion model 60 having a two-layer structure formed of unit layers of $Iz=4 \times t$ on the basis of a shaping model of a height LZ is illustrated in FIG. 6A.

Each layer of the filling portion model 60 has a planar shape illustrated in FIG. 6B. The filling portion model 60 in plan view is equivalent to a portion of the three-dimensional model 100 not corresponding to the framework portion model 50. That is, the filling portion model 60 include fourteen independent structures separated from one another by a distance of w by the partition wall structure of the framework portion model 50. The size of each structure in plan view is preferably smaller than the bottom surface of the ejection nozzle 4 and equal to or slightly larger than the ejection port 5. For example, it is preferable that a length Ix in the X direction, a length Iy in the Y direction, and a length of a diagonal in plan view are all smaller than Bw. In addition, Ix and Iy are preferably equal to or larger than D. These dimensional relationships are preferable for securely injecting the fused resin by covering the spaces defined by the partition walls with the ejection nozzle 4 when forming the fourteen structures of the filling portion sequentially after forming the framework portion. The details of this will be described later.

In step S4, the computer 31 generates, by referring to the framework portion model generated in step S2 and the filling portion model generated in step S3, a set of instructions necessary for the three-dimensional shaping apparatus to shape a three-dimensional model, and transmits the set of instructions to the controller 30. To be noted, the computer 31 may transmit the framework portion model and the filling portion model to the controller 30 instead of generating the set of instructions. In this case, the controller 30 may configure, by using the built-in CPU, a control program to generate the set of instructions necessary for shaping.

The set of instructions is configured as a set of instructions for executing a sequence of three-dimensionally shaping a portion corresponding to plural layers of a framework portion model and then three-dimensionally shaping a portion corresponding to a filling portion.

For example, the set of instructions generated on the basis of the framework portion model of FIGS. 5B and 5C and the filling portion model of FIGS. 6A and 6B is configured as a set of instructions for executing the following sequence. That is, first, lower four layers of a framework portion model are sequentially formed from the bottom to the top by relatively scanning the ejection nozzle 4 with respect to the stage 6. Next, the structures of the filling portion adjacent to the framework portion on the inner side are sequentially formed one by one. When forming each structure of the filling portion, the fused resin is continuously injected until the height of the fused resin reaches the thickness Iz of four layers of the framework portion model. Then, the filling portion is formed after additional four layers of the framework portion model are formed in a similar manner, and thus a three-dimensionally shaped object is completed. The set of instructions for executing such a sequence is stored in the RAM of the controller 30.

Figure 8A:
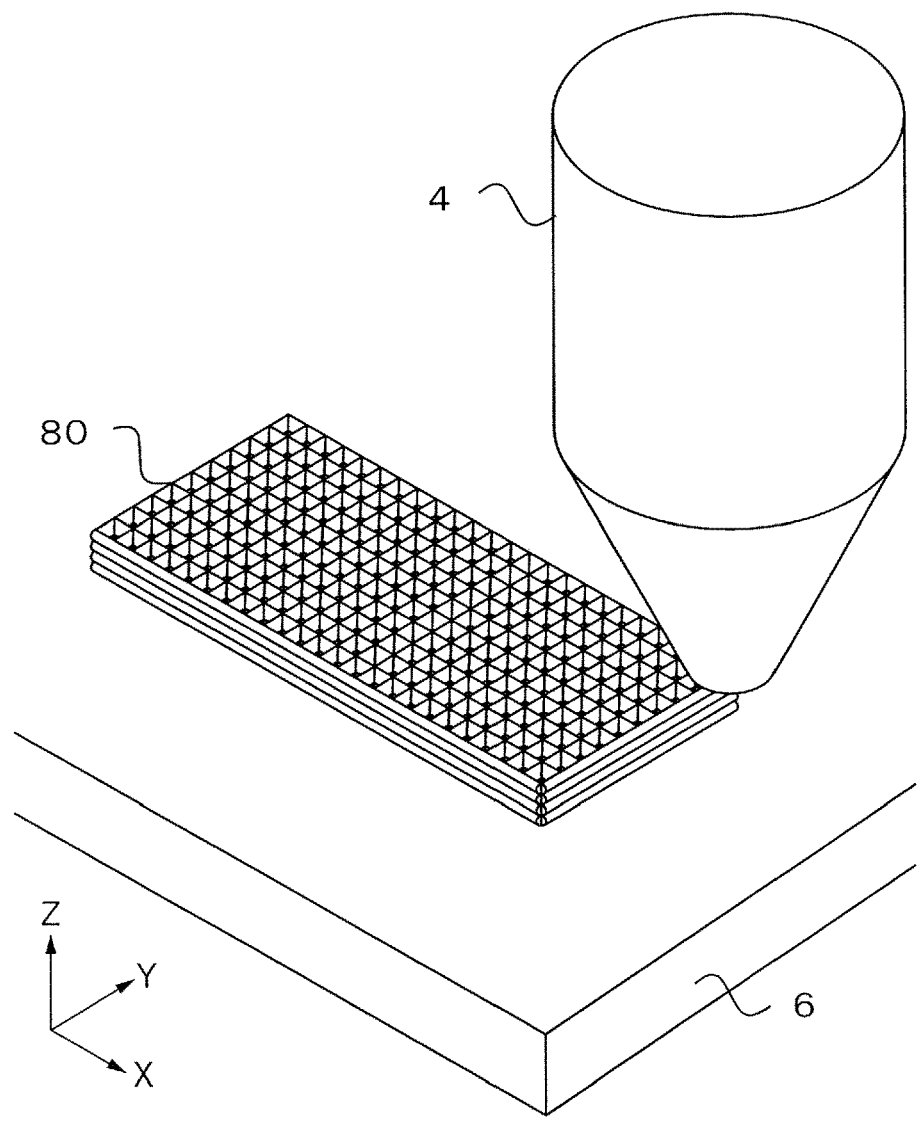
FIG. 8A is a perspective view illustrating a framework portion formation step of embodiments.
Figure 8B:
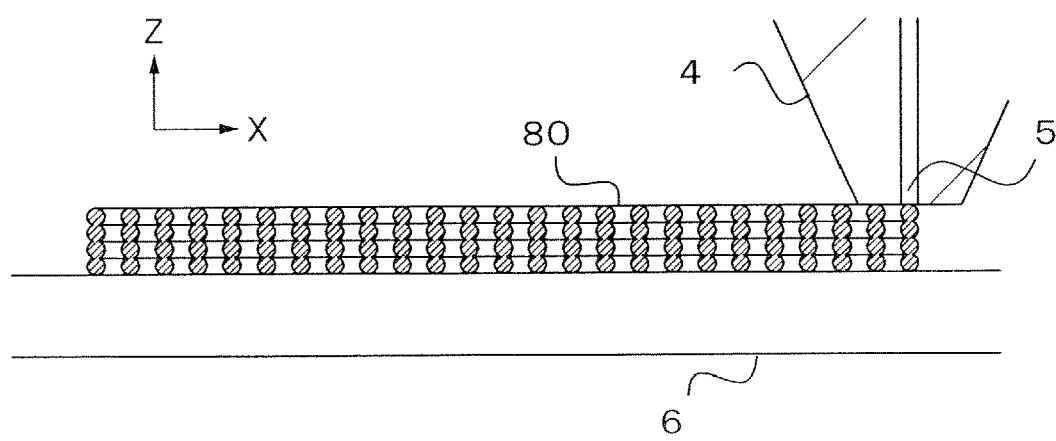
FIG. 8B is a partial section view illustrating the framework portion formation step of embodiments.

Next, in step S5, the controller 30 operates each component in accordance with the set of instructions generated in step S4 to form a framework portion 80 of the three-dimensionally shaped object from the fused thermoplastic resin, for example, as illustrated in FIGS. 8A and 8B. FIGS. 8A and 8B illustrate a state in which the width w illustrated in FIG. 5C is set to be equal to the width of a line after the ejection nozzle 4 has been scanned once and in which the fourth layer of the framework portion model has been formed.

To be noted, here, a layer corresponds to a part deposited in one time of application in the case of applying a fused thermoplastic resin plural times to deposit the thermoplastic resin in a thickness direction. In the case of applying and depositing a thermoplastic resin while relatively scanning an ejection head with respect to a stage, a layer corresponds to a part applied in one scanning. There are some cases where boundaries between layers can be observed in sectional observation or the like of the three-dimensionally shaped object, and there are some cases where no clear boundary is detected between layers when, for example, the uniformity of the thermoplastic resin is high.

The controller 30 drives the rollers 21 and 22 to supply an appropriate amount of unfused filament of thermoplastic resin to the heating portion. The controller drives the heater included in the heating portion to heat and fuse the filament of thermoplastic resin. The controller 30 relatively moves the ejection nozzle 4 and the stage 6, and thus forms the framework portion 80 from the thermoplastic resin as illustrated in FIG. 8A.

As illustrated in FIG. 8A, after forming four layers of patterns of the framework portion 80 from the thermoplastic resin, the controller 30 temporarily stops the rollers 21 and 22 to stop ejection of the fused resin through the ejection nozzle 4. When the framework portion is formed, the plural spaces each surrounded in the horizontal direction and open upward are defined by the partition walls constituting the framework portion. Therefore, step S5 can be also regarded as a partition wall formation step.

Figure 9A:
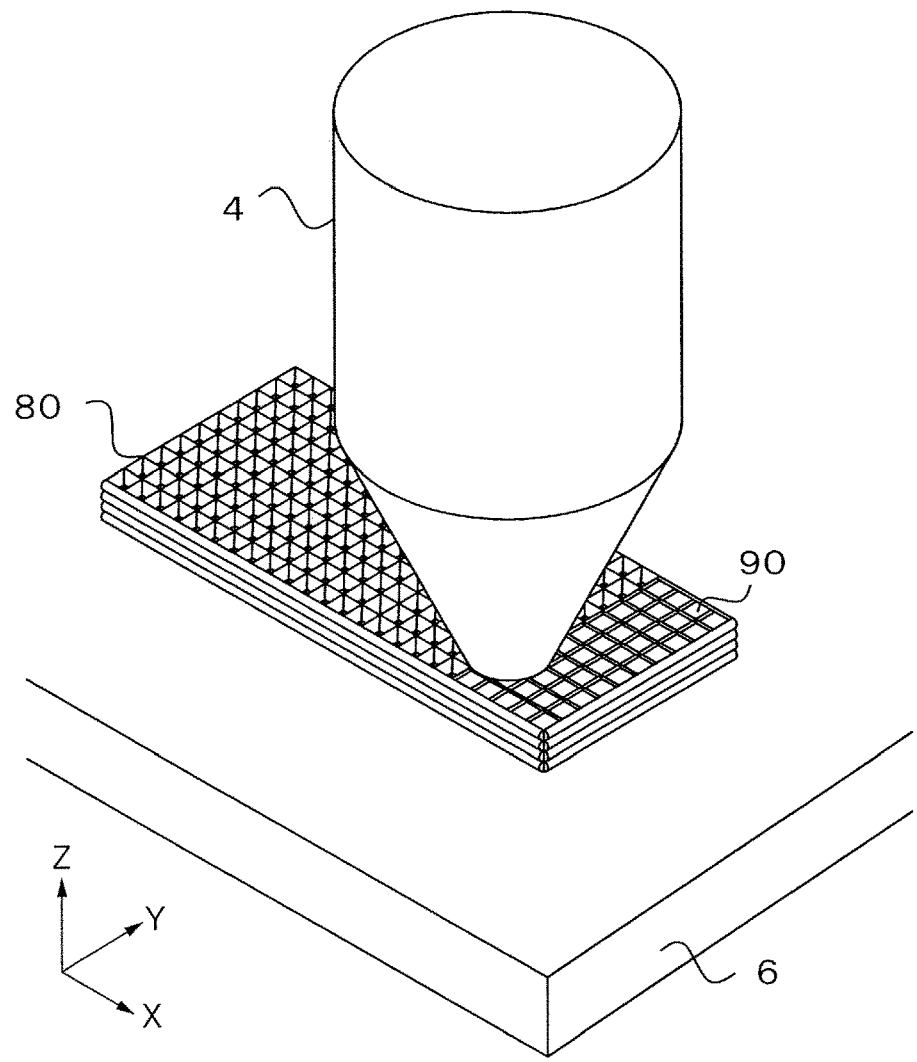
FIG. 9A is a perspective view illustrating a filling portion formation step of embodiments.
Figure 9B:
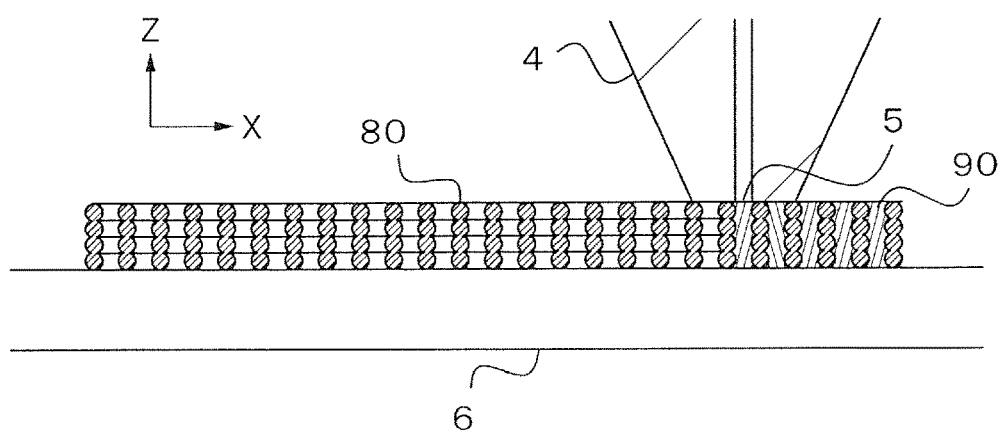
FIG. 9B is a partial section view illustrating the filling portion formation step of embodiments.

Next, in step S6, the controller 30 operates each component of the apparatus in accordance with the set of instructions to form a filling portion 90 adjacent to the framework portion 80 of the three-dimensionally shaped object on the inner side from the thermoplastic resin as illustrated in a perspective view of FIG. 9A and a partial section view of FIG. 9B. Since four layers of the framework portion of the three-dimensionally shaped object have been already formed in step S5, the filling portion is formed by applying the thermoplastic resin into the region surrounded in the horizontal direction by the four layers of the framework portion from above.

The controller 30 starts driving the rollers 21 and 22 again to supply an appropriate amount of the unfused filament of thermoplastic resin to the heating portion. The controller 30 drives the heater included in the heating portion to heat and fuse the filament of thermoplastic resin.

The controller 30 relatively moves the ejection nozzle 4 and the stage 6, and inject the thermoplastic resin into the part surrounded by the partition walls of the framework portion 80 to form the filling portion 90 as illustrated in FIG. 9B. Each section surrounded by the partition walls has a height corresponding to the four layers of the framework portion, and the next section is filled after filling one section is filled to the height of the four layers. That is, the ejection nozzle 4 is scanned such that plural sections serving as the filling portion are sequentially filled one by one with the fused resin.

The size of each section constituting the filling portion is set to be equal to or slightly larger than the ejection port 5 as described with regard to the relationship between the shape in plan view of the filling portion model of FIG. 6B and the shape of the bottom surface of the ejection head illustrated in FIG. 7B. Further, the size of each section is set to be smaller than the size of the bottom surface of the ejection head. Therefore, the fused resin can be selectively injected into just one section through the ejection port 5 by aligning the ejection head with the section as illustrated in FIG. 9B. At this time, the flat bottom surface of the ejection head in the vicinity of the ejection port 5 comes into contact with the top surface of the partition walls of the framework portion, and the section is thereby covered. As an effect of this covering, a predetermined injection pressure can be applied by appropriately controlling the drive of the rollers 21 and 22 when injecting the fused resin into a section.

At this time, the section can be covered by controlling the position of the stage 6 with respect to the ejection head by the Z movement mechanism 9 such that the bottom surface of the ejection head comes into firm contact with the top surface of the framework portion. In the case of bringing the bottom surface of the ejection nozzle into contact with the top surface of the framework portion with a predetermined contact pressure applied therebetween to improve the sealing property of the covering, the Z movement mechanism 9 is operated via a combination of position control and force control.

Then, by stopping the driving of the rollers 21 and 22 at a timing at which the injection of fused resin of a volume corresponding to the height of the four layers of the framework portion is completed, the section can be prevented from overflowing with the fused resin. After the injection of fused resin into one section is completed, the ejection head and the framework portion are temporarily separated by descending the stage 6 by the Z movement mechanism 9, and the ejection head is moved to a position above the next section by the X movement mechanism 7 and the Y movement mechanism 8. Then, the stage 6 is ascended by the Z movement mechanism 9 to control the relative positions of the ejection head and the stage 6 such that the ejection head covers the next section.

In this way, by sequentially injecting the fused resin through the ejection port 5 with an appropriate pressure after covering each section with the bottom surface of the ejection head, the framework portion and the filling portion can be interconnected without any gap therebetween.

Figure 10:
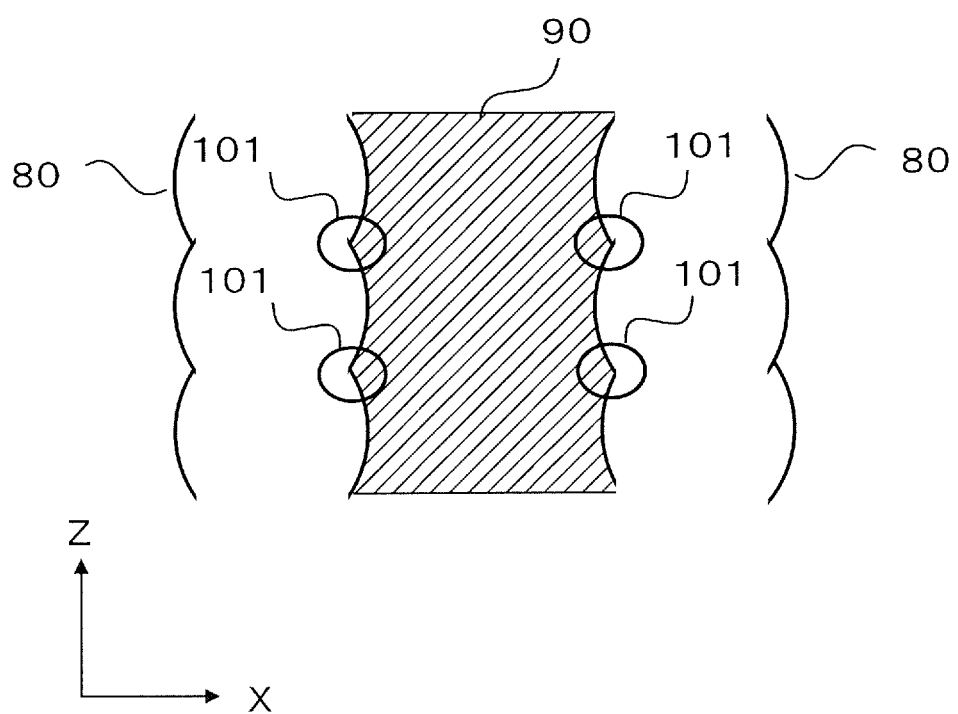
FIG. 10 is a partial section view illustrating a joint state of a framework portion and a filling portion of embodiments.

FIG. 10 is a partially enlarged view of the section view of FIG. 9B. Since the framework portion 80 is formed by depositing plural layers, the side surfaces thereof are not flat and include recess portions 101 as illustrated in FIG. 10. According to the present exemplary embodiment, by injecting the fused resin through the ejection port 5 with an appropriate pressure after covering each section with the bottom surface of the ejection head, the fused resin can be securely injected also into the recess portions 101.

Figure 11:
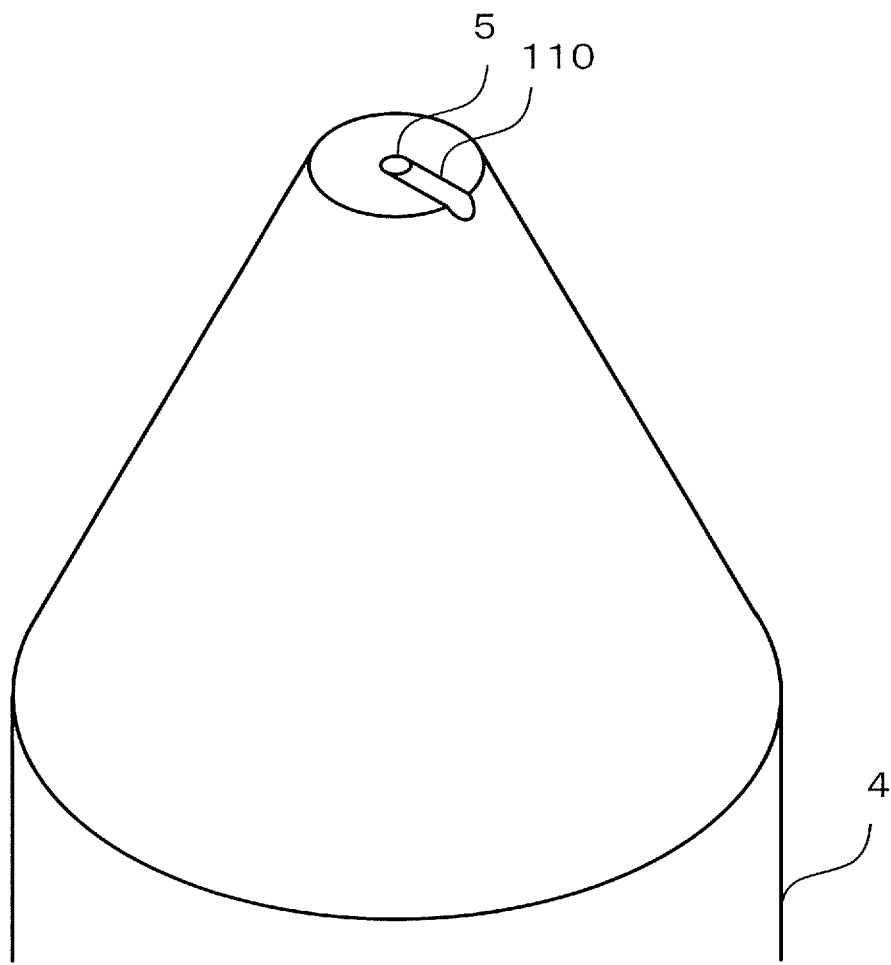
FIG. 11 is a perspective view of a distal end portion of an ejection head of embodiments.

In the present exemplary embodiment, an ejection head having a particularly suitable shape for injecting the fused resin with an appropriate pressure by covering the framework portion is used. FIG. 11 is a perspective view of the ejection head illustrating the shape of a portion thereof in the vicinity of the distal end of the ejection nozzle 4. FIG. 11 illustrates the ejection head in an inverted state different from a normal use state for the sake of convenience of illustration of the distal end shape. Although the vicinity of the ejection port 5 at the distal end of the ejection nozzle 4 usually has a flat surface, a groove 110 for exhausting air is provided in the present exemplary embodiment. In this example, the groove 110 has a width of 0.5 mm and a depth of 0.01 mm. The width and depth of the groove 110 preferably has such a size as to efficiently exhaust air in a section when covering the section in the framework portion and injecting the fused resin into the section. Meanwhile, the width and depth are required to be controlled such that the resin does not leak through the groove 110. The shape of the groove 110 for exhausting air is not limited to the example of FIG. 11 as long as such requirement is satisfied, and, for example, plural grooves may be radially provided from the ejection port 5.

After injecting the resin to form the filling portion in step S6, whether formation of all layers of the three-dimensional shaping model has been completed is checked.

In the example of the three-dimensional shaping model of FIG. 5A, a framework portion model in which the height LZ of the entire model is divided into eight layers is constructed as illustrated in FIG. 5B. Since only four layers of the framework portion and the filling portion have been formed at the time of FIG. 9, the process returns to step S5. Additional four layers of the framework portion are further formed in step S5, and then the upper part of the filling portion is formed in step S6.

Then, in the case where it is confirmed that formation of all layers of the three-dimensional shaping model has been completed in step S7, the three-dimensional shaping process is finished.

According to the present exemplary embodiment, for example, in FIG. 9, each structure of the filling portion 90 is formed as a single body in one injection instead of sequentially forming four layers, and thus does not have boundaries between layers and is rigid. Moreover, since the fused resin for forming the filling portion 90 is securely injected also into the recess portions 101 of the framework portion 80, the filling portion 90 and the framework portion 80 both exert an anchoring effect and bind each other. Therefore, the three-dimensionally shaped object formed in the present exemplary embodiment can be regarded as a structure having a much greater rigidity than a three-dimensionally shaped object formed by depositing planar patterns layer by layer as conventional embodiments. Further, it can be said that since the outer shell portion is formed in advance as a part of the framework portion, the precision of the shape of the present exemplary embodiment stands comparison with conventional methods.

Second Exemplary Embodiment

A configuration of a three-dimensional shaping apparatus and a three-dimensional shaping method according to a second exemplary embodiment of the present invention will be described. In contrast to the first exemplary embodiment in which the framework portion and the filling portion are formed by using the same ejection head, in the second exemplary embodiment, the framework portion and the filling portion are respectively formed by using ejection heads respectively dedicated thereto.

Configuration of Apparatus

Figure 12:
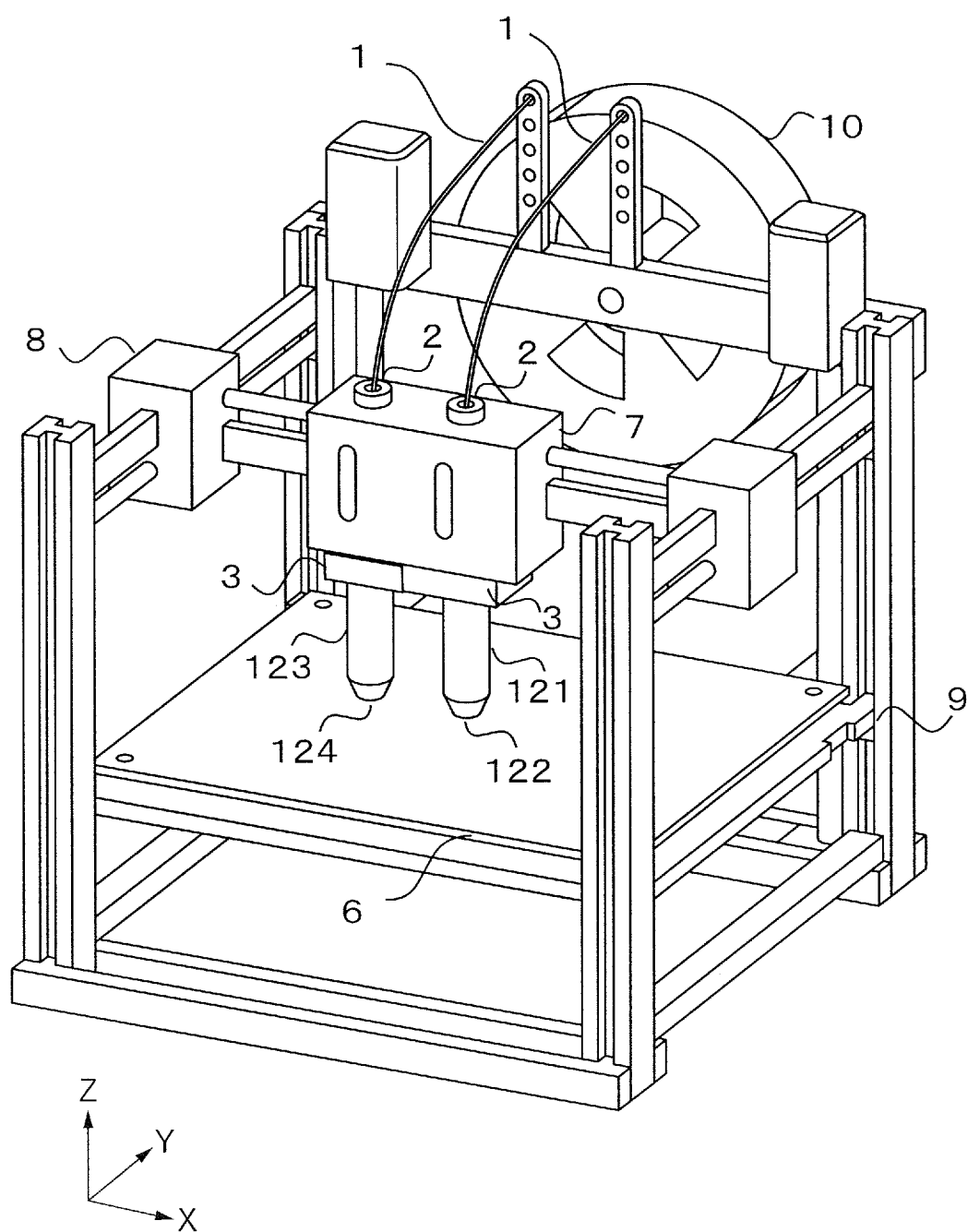
FIG. 12 is a perspective view of a three-dimensional shaping apparatus of a second exemplary embodiment.

FIG. 12 is a schematic perspective view of the three-dimensional shaping apparatus according to the second exemplary embodiment of the present invention. The three-dimensional shaping apparatus includes material introduction portions 2, heating supplying portions 3, a stage 6, an X movement mechanism 7, a Y movement mechanism 8, a Z movement mechanism 9, and reels 10, and shaping materials 1 are set in the material introduction portions 2. These components are overall the same as the apparatus of the first exemplary embodiment except that two material introduction portions 2, two heating supplying portions 3, and two reels 10 are provided, and thus detailed descriptions of these components will be omitted.

In addition, the three-dimensional shaping apparatus includes an ejection nozzle 121 and an ejection port 122 for forming a framework portion, and an ejection nozzle 123 and an ejection port 124 for forming a filling portion.

A difference between the shapes of the distal end portions of the nozzles for forming the framework portion and for forming the filling portion will be described with reference to FIGS. 7A and 7B. The diameter Bw of the distal end surface of the ejection nozzle 121 for forming the framework portion is smaller than the diameter Bw of the distal end surface of the ejection nozzle 123 for forming the filling portion. In addition, the inner diameter D of the ejection port 122 for forming the framework portion is smaller than the inner diameter D of the ejection port 124 for forming the filling portion. By employing such a configuration, a head suitable for forming a fine structure can be used, and thus the outer shell portion and the partition walls can be formed with a high precision of shape. Meanwhile, a head having a large bottom surface and a large ejection port can be used when forming the filling portion and cover the partition walls with a larger head, and thus the size of sections defined by the framework portion for forming the filling portion can be increased. That is, since the diameter Bw of the distal end surface of the ejection nozzle 123 for forming the filling portion is large, Ix and Iy in FIG. 6B can be increased. Further, although the volume of each section for forming the filling portion is increased, since the inner diameter D of the ejection port 124 for forming the filling portion is set to be large, the fused resin can be fully injected in a short time. To be noted, although it is preferable that the groove 110 for exhausting air illustrated in FIG. 11 is defined on the distal end portion of the ejection nozzle 123 for forming the filling portion, the groove 110 does not have to be provided on the ejection nozzle 121 for forming the framework portion.

Control Blocks

Control blocks of the apparatus of the second exemplary embodiment is overall the same as the control blocks of the first exemplary embodiment illustrated in FIG. 3.

However, in the present exemplary embodiment, since nozzles dedicated for formation of the framework portion and for formation of the filling portion are provided, two control systems for ejection nozzles are provided. In addition, since the sizes of the nozzles for forming the framework portion and for forming the filling portion are different, a different program from the first exemplary embodiment is employed for the computer 31 to execute to construct the framework portion model and the filling portion model.

Three-Dimensional Shaping Process

A three-dimensional shaping process of the second exemplary embodiment is overall the same as the three-dimensional shaping process of the first exemplary embodiment described with reference to the flowchart of FIG. 4.

However, in step S2, the width w of the partition walls used for generating the framework portion model is set to be an integer multiple of the width of a line that can be formed in one scanning by the ejection nozzle 121 for forming the framework portion.

In addition, the sizes Ix and Iy of a section used for generating the filling portion model are set to be smaller than the diameter Bw of the distal end surface of the ejection nozzle 123 for forming the filling portion and equal to or slightly larger than the inner diameter D of the ejection port 124 for forming the filling portion. This is for covering the partition walls constituting the framework portion with the distal end of the ejection nozzle 123 for forming the filling portion and injecting the fused resin with an appropriate pressure.

In addition, in the first exemplary embodiment, although four side surfaces of the three-dimensionally shaped object are formed as the outer shell portion included in the framework portion model when, for example, forming the three-dimensionally shaped object of FIG. 5A, the bottom surface and the top surface are formed as surfaces in which the framework portion and the filling portion are present at the same time. Contrary to this, in the second exemplary embodiment, a framework portion model including not only the side surfaces but also the bottom and top surfaces as the outer shell portion is generated in step S2, and the bottom and top surfaces are also formed by using the ejection nozzle 121 for forming the framework portion in step S5.

In addition, in the second exemplary embodiment, the set of shaping instructions generated in step S4 is a set of instructions with which the ejection nozzles of two systems are appropriately used in accordance with the situation. That is, the second exemplary embodiment is different from the first exemplary embodiment in that the set of instructions include instructions for causing the ejection nozzle 121 for forming the framework portion to be driven at the time of forming the framework portion and the ejection nozzle 123 for forming the filling portion to be driven at the time of forming the filling portion.

In step S5, the framework portion is formed by using the ejection nozzle 121 for forming the framework portion, and, in step S6, the filling portion is formed by using the ejection nozzle 123 for forming the filling portion.

Figure 13A:
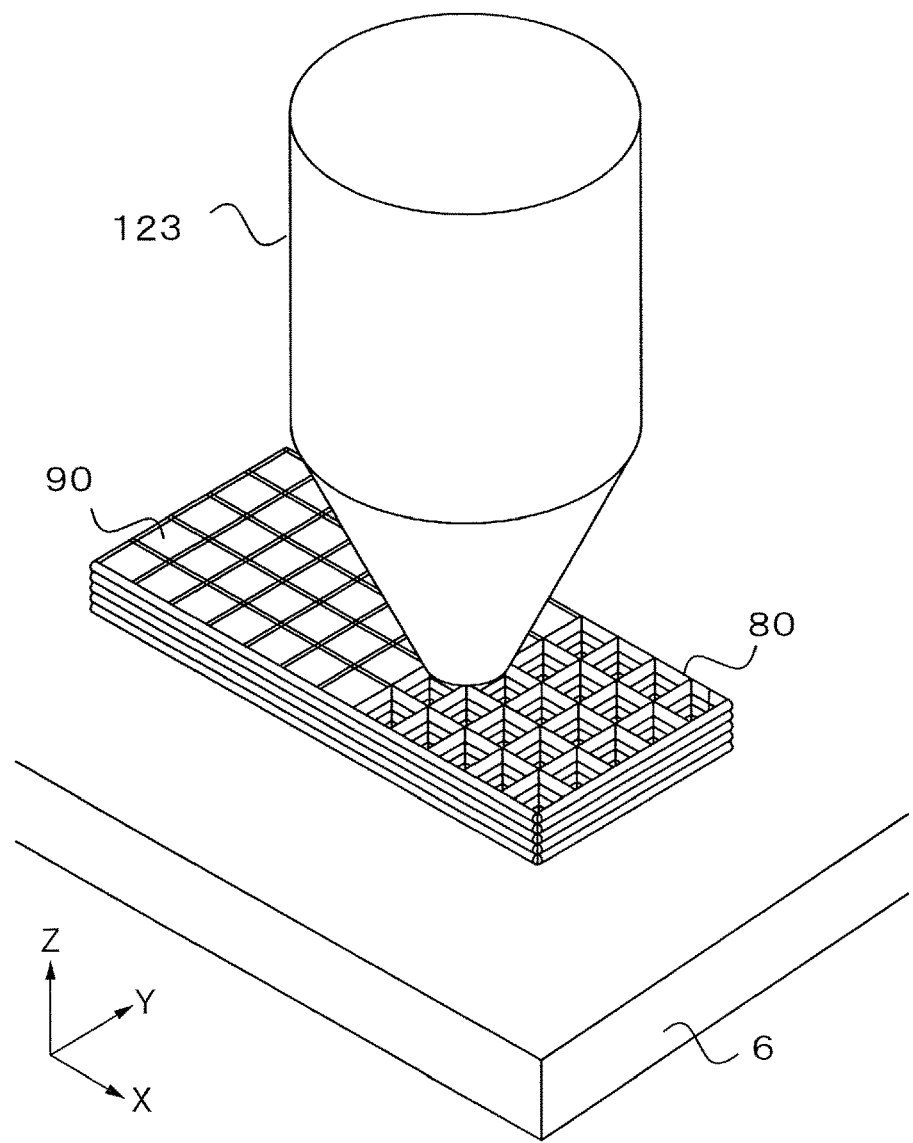
FIG. 13A is a perspective view illustrating a filling portion forming step of embodiments.
Figure 13B:
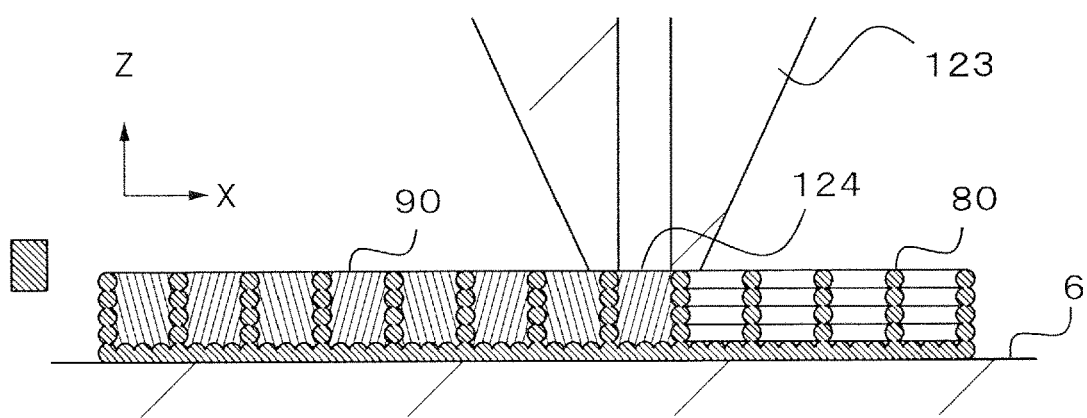
FIG. 13B is a partial section view illustrating the filling portion forming step of embodiments.

A perspective view of FIG. 13A and a partial section view of FIG. 13B illustrate a state in which the filling portion is being formed in step S6.

In the present exemplary embodiment, the bottom surface is also formed as the framework portion, and thus five layers of the framework portion 80 including a bottom surface layer in contact with the stage 6 and four layers thereon are formed by using the ejection nozzle 121 for forming the framework portion having a small ejection port as illustrated in FIG. 13B. Further, spaces defined by partition walls of the four layers of the framework portion are sequentially filled with the fused resin by using the ejection nozzle 123 for forming the filling portion, and thus the filling portion 90 is formed. It can be seen from FIG. 13B that the diameter Bw of the distal end surface of the ejection nozzle 123 for forming the filling portion and the diameter of the ejection port 124 are larger than the ejection nozzle 121 for forming the framework portion and thus the fused resin can be injected into a larger section than in the first exemplary embodiment.

Similarly to the first exemplary embodiment, steps S5 to S7 are repeated until formation of all layers constituting the three-dimensionally shaped object is completed. However, in the present exemplary embodiment, the topmost layer corresponding to the top surface of the three-dimensionally shaped object is formed as the outer shell included in the framework portion by using the ejection nozzle 121 for forming the framework portion.

According to the present exemplary embodiment, for example, in FIG. 13, each structure of the filling portion 90 is formed as a single body in one injection instead of sequentially forming four layers, and thus does not have boundaries of layers and is rigid. Moreover, since the filling portion 90 is securely injected also into the recess portions 101 of the framework portion 80, the filling portion 90 and the framework portion 80 both exert an anchoring effect and bind each other. Therefore, the three-dimensionally shaped object formed in the present exemplary embodiment can be regarded as a structure having a much greater rigidity than a three-dimensionally shaped object formed by depositing planar patterns layer by layer as conventional embodiments. Further, it can be said that since all outer surfaces are formed as a part of the framework portion by using an ejection nozzle having a small ejection port, the precision of the shape of the present exemplary embodiment stands comparison with conventional methods.

Further, according to the present exemplary embodiment, by employing an apparatus configuration in which the framework portion and the filling portion are respectively formed by using dedicated ejection heads, the flexibility in design of the shapes of models of the framework portion and the filling portion increases.

By setting the area of the distal end surface of the ejection head for forming the filling portion to be large, the section in which the filling portion is to be formed can be securely covered even if the size of the section is increased. In addition, in the case where the size of the section is increased, the size of the ejection port 124 for forming the filling portion can be increased. Therefore, the amount of flow of the fused resin can be increased, and thus the time required for shaping can be shortened.

In addition, the groove for exhausting air for pressurized injection may be provided only on the ejection head for forming the filling portion, and does not have to be provided on the ejection head for forming the framework portion. Therefore, the fused resin ejected through the ejection head for forming the framework portion is not influenced at all by the groove for exhausting air, and thus the precision of the outer shape of the three-dimensionally shaped object can be kept high.

Although the first and second exemplary embodiments have been described above, embodiments of the present invention are not limited to these.

For example, although the width w of the framework portion is set to be equal to the width of a line that can be formed by one scanning of an ejection nozzle in the exemplary embodiments above, the width w may be set to be an integer multiple of the width of the line. In the case where the width w is increased, the strength of the partition walls increases, and the pressure of the injection of the fused resin for forming the filling portion can be increased because the area of contact between the ejection head and the partition walls when covering the partition walls to form the filling portion can be increased and thus the sealing property can be increased. In addition, the width w may be changed between the outer shell portion serving as the outer surface of the three-dimensionally shaped object and the partition wall portion dividing the filling portion.

In addition, the first exemplary embodiment and the second exemplary embodiment can be combined as appropriate. For example, the bottom surface and top surface of the three-dimensionally shaped object may be formed as the framework portion similarly to the second exemplary embodiment by using the apparatus of the first exemplary embodiment. Conversely, shaping may be performed such that the framework portion and the filling portion are present at the same time in the bottom surface and the top surface of the three-dimensionally shaped object as in the first exemplary embodiment by using the apparatus of the second exemplary embodiment.

In addition, although the spaces defined by the partition walls for forming the filling portion are set as rectangular parallelepiped or cubic spaces having a rectangular bottom surface having sides of lengths of Ix and Iy and a height of Iz in the exemplary embodiments described above, the shape thereof is not necessarily limited to this. That is, the spaces may have any shapes as long as the spaces are defined in such shapes that the shape of the distal end surface of the ejection head and the shapes of the spaces have such a relationship that the fused resin does not leak to another section when the ejection head covers a space and the filling portion is formed. Depending on the shape of the three-dimensionally shaped object to be shaped, there are some cases where a geometrical configuration is not possible just by regularly arranging rectangular parallelepiped structures of the filling portion. Therefore, the structures of the filling portion may have prismatic shapes such as triangular prisms or hexagonal prisms.

In addition, the shape of the ejection port of the ejection head is not limited to a circular shape as in the exemplary embodiments described above, and, for example, polygonal shapes such as a square shape can be also employed.

In addition, in the case of providing the ejection head for forming the framework portion and the ejection head for forming the filling portion separately as in the second exemplary embodiment, different thermoplastic resins may be used in addition to configuring the structures of the heads differently. For example, resins of different colors may be used for forming the framework portion and for forming the filling portion, and resins having different elastic coefficients after curing may be used for forming the framework portion and for forming the filling portion.

Examples of First Exemplary Embodiment

Examples 1 to 4 serving as specific examples of shaping a three-dimensionally shaped object and Comparative Examples 1 and 2 for reference will be described below.

In all of Examples 1 to 4 and Comparative Examples 1 and 2, a resin member having a rectangular parallelepiped shape shown in FIG. 5A was produced by using an ejection head provided with an ejection port having a circular shape and an opening diameter of 0.5 mm. The specific dimensions of the resin member were $LX=80$ mm, $LY=10$ mm, and $LZ=2$ mm.

In Examples 1 to 4, the width w of the partition walls constituting the framework portion was set to 0.5 mm, the thickness t of one layer of the framework portion was set to 0.4 mm, the total number of layers of the framework portion continuously deposited was set to 5, and the dimensions of the filling portion Ix, Iy, and Iz were respectively set to 0.5 mm, 0.5 mm, and 2.0 mm. The resin member was formed by using the three-dimensional shaping method described in the first exemplary embodiment.

In Comparative Examples 1 and 2, the resin member was produced by using a method of forming the three-dimensionally shaped object by depositing planar patterns layer by layer from the bottom to the top as disclosed in Japanese Patent Laid-Open (Translation of PCT Application) No. 2010-521339 without distinguishing the framework portion and the filling portion.

Shaping conditions and flexural moduli of the resin member of Examples 1 to 4 and Comparative Examples 1 and 2 are shown in Table 1.

TABLE 1

|  | Example 1 | Example 2 | Example 3 | Example 4 | Comparative Example 1 | Comparative Example 2 |
| --- | --- | --- | --- | --- | --- | --- |
| Resin material | ABS | PC/ABS | ABS | ABS | ABS | PC/ABS |
| Shape of ejection port | Circle | Circle | Circle | Circle | Circle | Circle |
| Size of ejection port (mm) | Φ0.5 | Φ0.5 | Φ0.5 | Φ0.5 | Φ0.5 | Φ0.5 |
| Contact pressure (MPa) | 0 | 0 | 3 | 3 |  |  |
| Injection pressure (MPa) | 0 | 0 | 3 | 5 |  |  |
| Flexural modulus (GPa) | 2.02 | 2.24 | 2.15 | 2.14 | 1.77 | 1.9 |

As shown in Table 1, in Examples 1, 3, and 4 and Comparative Example 1, ABS, that is, acrylonitrile-butadiene-styrene copolymer was used as the thermoplastic resin. In addition, in Example 2 and Comparative Example 2, PC/ABS, that is, a polymer alloy of polycarbonate and ABS was used as the thermoplastic resin. Each material was processed into a form of filament having a diameter of 1.75 mm, and the shaping apparatus of FIG. 1 was used. The temperature of the heater of the nozzle was controlled to be 230° C., and the size of the ejection port was Φ=0.5 mm.

In Examples 1 and 2, position control was performed at the time of forming the filling portion such that the distal end of the nozzle was in contact with the partition walls of the framework portion, but no contact pressure was applied to the partition walls. In addition, shaping was performed without applying an injection pressure to the fused resin at the time of forming the filling portion.

In contrast, in Example 3, shaping was performed by controlling the contact pressure of the distal end of the nozzle with the partition walls and the injection pressure of the fused resin to be both 3 MPa.

In Example 4, shaping was performed by applying a contact pressure of 3 MPa between the partition walls and the distal end of the nozzle, and applying an injection pressure of 5 MPa to the fused resin.

To assess the strength of the shaped member, measurement of flexural modulus was performed. The measurement was performed by using a Tabletop Precision Universal Tester manufactured by SHIMADZU Corporation.

As shown in Table 1, resin members of Examples 1 to 4 had higher flexural moduli than resin members of Comparative Examples 1 and 2.

In addition, Examples 3 and 4 in which an injection pressure was applied showed higher flexural moduli and achieved higher structural strengths than Example 1 in which an ABS material was used similarly and no injection pressure was applied. From this, it can be understood that, by applying an injection pressure and a contact pressure, the resin of the filling portion thoroughly got into the recess portion of the framework portion and the strength as structures has been improved.

To be noted, although a higher injection pressure than Example 3 was applied in Example 4, the flexural modulus of Example 4 was almost the same as the flexural modulus of Example 3. One reason for this can be considered to be because 3 MPa was already sufficient for injecting the resin into the recess portion of the framework portion. However, since the injection pressure was higher than the contact pressure in Example 4, there is a possibility that a small amount of resin leaked through a contact portion between the ejection head and the partition walls. Therefore, it can be also considered that the small difference from the flexural modulus of Example 3 resulted from a high injection pressure not being effectively applied. Therefore, there is a possibility that the strength can be further improved by setting the width w of the partition walls of the framework portion to be larger to improve the structural strength of the partition walls, increasing the contact pressure to 5 MPa to improve the sealing property of the covering, and setting the injection pressure to 5 MPa. That is, in order to ensure the sealing property as covering, although the contact pressure needs to be suppressed to a degree not deforming the partition walls, the contact pressure is preferably equal to or larger than the injection pressure to prevent the fused resin from leaking.

As shown in Table 1 above, it was confirmed that the shaped objects produced via the fused deposition modeling of the present invention have high structural strength than Comparative Examples. To be noted, the precision of the shapes of the members of Examples and Comparative Example was almost the same because ejection nozzles of the same opening diameter were used.

Examples of Second Exemplary Embodiment

Examples 5 and 6 in which the resin member was shaped on the basis of the three-dimensional shaping method described in the second exemplary embodiment will be described.

In Examples 5 and 6, a resin member having a rectangular parallelepiped shape illustrated in FIG. 5A was formed by using the three-dimensional shaping apparatus illustrated in FIG. 12. The specific dimensions of the resin member were LX=80 mm, LY=10 mm, and LZ=2 mm.

In Examples 5 and 6, the width w of the partition walls constituting the framework portion was set to 0.5 mm, the thickness t of one layer of the framework portion was set to 0.4 mm, the total number of layers of the framework portion continuously deposited was set to 5, and the dimensions of the filling portion Ix, Iy, and Iz were respectively set to 1.5 mm, 1.5 mm, and 2.0 mm.

Shaping conditions and flexural moduli of the resin member of Examples 5 and 6 are shown in Table 2.

TABLE 2

|  |  | Example 5 | Example 6 |
|---|---|---|---|
| First nozzle | Resin material | ABS | ABS |
|  | Shape of ejection port | Circle | Circle |
|  | Size of ejection port (mm) | Φ0.5 | Φ0.5 |
| Second nozzle | Shape of ejection port | Circle | Square |
|  | Size of ejection port (mm) | Φ1.5 | 1.5 × 1.5 |
| Shaping condition | Contact pressure (MPa) | 3 | 3 |
|  | Injection pressure (MPa) | 3 | 3 |
|  | Flexural modulus (GPa) | 2.40 | 2.41 |

In both of Examples 5 and 6, ABS, that is, acrylonitrile-butadiene-styrene copolymer was used as the thermoplastic resin. The material was processed into a form of filament having a diameter of 1.75 mm.

In Examples 5 and 6, a first nozzle and a second nozzle shown in Table 2 were respectively used as a nozzle for forming the framework portion and a nozzle for forming the filling portion. For both of the first nozzle and the second nozzle, the temperature of built-in heaters was controlled to 230° C.

In Example 5, a nozzle having a circular ejection port of Φ=0.5 mm was used as the first nozzle, and a nozzle having a circular ejection port of Φ=1.5 mm was used as the second nozzle.

In Example 6, a nozzle having a circular ejection port of Φ=0.5 mm was used as the first nozzle, and a nozzle having a square ejection port of 1.5 mm×1.5 mm was used as the second nozzle.

In Examples 5 and 6, shaping was performed by applying a contact pressure of 3 MPa between the ejection head and the framework portion at the time of forming the filling portion, and by applying an injection pressure of 3 MPa to the fused resin.

As shown in Table 2, resin members of Examples 5 and 6 had higher flexural moduli and achieved higher structural strength than the resin member of Comparative Example 1 shaped from the same resin material.

In addition, in Examples 5 and 6, since the size of each section of the filling portion was increased and the filling portion was formed by filling each section by using an ejection head provided with a large ejection port, the time required for three-dimensional shaping could be shortened compared with Examples 1 to 4.

Third Exemplary Embodiment

A configuration of a three-dimensional shaping apparatus and a three-dimensional shaping method according to a third exemplary embodiment of the present invention will be described in this order.

Configuration of Apparatus

Figure 14:
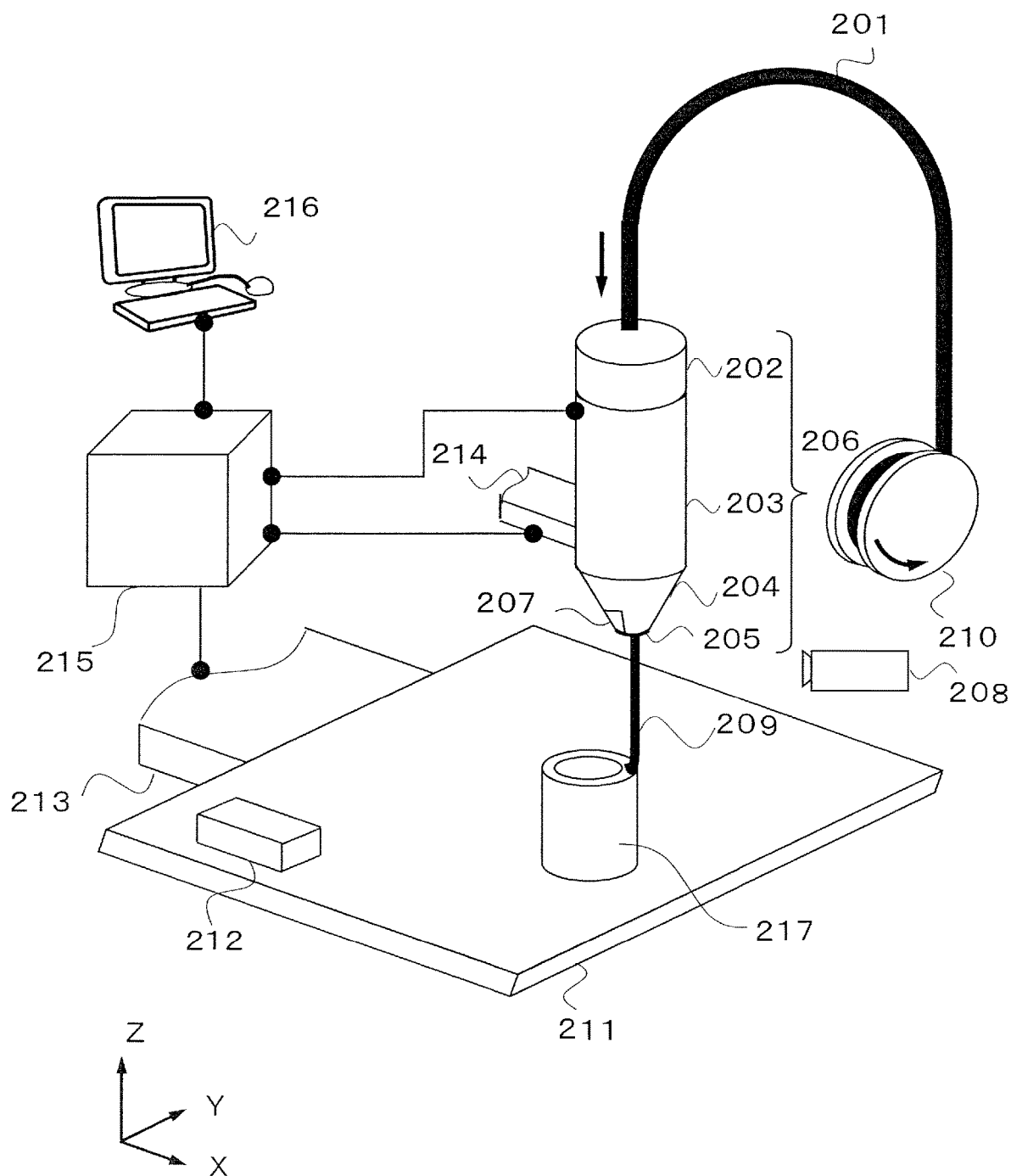
FIG. 14 is a perspective view of a three-dimensional shaping apparatus of a third exemplary embodiment.

FIG. 14 is a schematic perspective view of the three-dimensional shaping apparatus according to the third exemplary embodiment of the present invention.

FIG. 14 illustrates a shaping material 201, a material introduction portion 202, a heating portion 203, an ejection nozzle 204, an ejection port 205, an ejection head 206, a temperature sensor 207, an infrared temperature sensor 208, a fused resin 209, a reel 210, a stage 211, and a vibrator 212. In addition, FIG. 14 illustrates a stage moving device 213, an ejection head moving device 214, a controller 215, a computer 216, and a three-dimensionally shaped object 217.

The shaping material 201 is a raw material used for three-dimensional shaping. Although a thermoplastic resin shaped into a filament is used in the present exemplary embodiment, materials in other forms such as pellets and powder may be also used.

The filament used as the shaping material 201 preferably has, for example, a circular sectional shape, a diameter of 1.5 mm to 3.0 mm, and a length of 10 m to 1000 m. The shaping material 201 is stored by being wound up around the reel 210. The shaping material 201 can be supplied to the material introduction portion 202 by rotating the reel 210 in an arrow direction in FIG. 14.

In addition, examples of the thermoplastic resin that can be used in the present exemplary embodiment include PC resin, ABS resin, PC/ABS polymer alloy, PLA resin, PPS resin, PEI resin, PET resin, and modified resins of these.

The ejection head 206 is a head that heats and fuses the thermoplastic resin serving as the shaping material 201, and ejects the thermoplastic resin as a columnar fused resin 209 while controlling the viscosity thereof. The ejection head 206 includes the material introduction portion 202, the heating portion 203, the ejection nozzle 204, the ejection port 205, and the temperature sensor 207.

The material introduction portion 202 is a part for introducing the shaping material 201 into the ejection head 206, and exemplarily has a configuration similar to the configuration illustrated in FIG. 2. That is, the filament of the shaping material 201 is nipped by the rollers 21 and 22, and can be pulled in from the reel 210 and sent into the heating portion 203 as a result of the rollers 21 and 22 rotating in the directions indicated by arrows in FIG. 2. The amount of supply of the shaping material 201 to the heating portion 203 can be adjusted by controlling the rotation speed of the rollers 21 and 22 by the controller 215.

The heating portion 203 heats and fuses the thermoplastic resin supplied from the material introduction portion 202. The heating portion 203 includes a heater that is not illustrated, and can adjust the temperature of the fused resin by controlling the amount of heat generated by the heater. As will be described later, since the viscosity of the fused resin changes in accordance with the temperature, the viscosity can be controlled by adjusting the temperature of the fused resin.

The thermoplastic resin in a fused state is sent into the ejection nozzle 204 by being pushed by a succeeding material. The ejection nozzle 204 includes the ejection port 205 having a predetermined shape and the temperature sensor 207. The thermoplastic resin in a fused state is ejected through the ejection port 205 in a direction opposite to a Z direction in FIG. 14 as the fused resin 209.

To be noted, the shape of the opening of the ejection port 205 may be set to, for example, a circular shape, and it is preferable that an opening shape changing mechanism for changing the size and shape of the opening in accordance with the viscosity of the thermoplastic resin to be ejected is provided.

The fused resin 209 ejected through the ejection port 205 advances as a columnar viscous fluid in the vertical direction, that is, toward the stage 211. In a step of forming the first layer of the three-dimensionally shaped object 217, the fused resin 209 is deposited on the surface of the stage 211, and, in the case of forming the second or subsequent layer, the layer is deposited on the surface of a lower layer that has been already deposited. In either case, the temperature of the fused resin 209 is reduced a glass transition temperature Tg or a lower temperature and is solidified after the fused resin 209 is deposited.

The temperature sensor 207 is a sensor for measuring the temperature of the thermoplastic resin to be ejected, and is disposed in the vicinity of the ejection port 205 in the ejection nozzle 204.

In addition, the infrared temperature sensor 208 is a sensor for measuring the temperature of the fused resin 209 immediately after being ejected with no contact, and is disposed in the vicinity of the ejection port 205 outside the ejection nozzle 204.

The temperature sensor 207 and the infrared temperature sensor 208 measures the temperature and transmits the measured temperature to the controller 215, and the results of measurement are referred to for controlling the viscosity of the fused resin 209 as will be described later.

Although the temperature sensor 207 and the infrared temperature sensor 208 are used in the present exemplary embodiment in order to improve the reliability of control of the viscosity of the fused resin 209, not both of these sensors are always needed, and just one of these is sufficient in some case.

The stage 211 is a base stage for supporting the three-dimensionally shaped object 217, and the vibrator 212 is mounted thereon. The vibrator 212 is a vibrator for vibrating the stage 211 at the time of performing shaping by ejecting a fused resin of a low viscosity as will be described later. As the vibrator 212, for example, an ultrasonic vibrator that can generate an ultrasonic wave is used, and other devices may be also used.

The stage moving device 213 is a mechanism for moving the stage 211 in three directions of X, Y, and Z, and operates under control of the controller 215.

The ejection head moving device 214 is a mechanism for moving the ejection head 206 in three directions of X, Y, and Z, and operates under control of the controller 215.

To be noted, to form one layer of a three-dimensionally shaped object, the ejection head 206 and the stage 211 are relatively scanned in an X-Y plane while a relative distance therebetween in the Z direction is kept constant. In addition, to form a next layer, the ejection head 206 and the stage 211 are relatively scanned in the X-Y plane after the relative distance therebetween in the Z direction is increased by an amount corresponding to one layer. For example, in the case of shaping the three-dimensionally shaped object 217 having a cylindrical shape, either one of the ejection head 206 and the stage 211 is moved circularly in the X-Y plane while the fused resin 209 is ejected. Further, the distance between these two in the Z direction is gradually increased as the number of deposited layers increases.

Although both of the stage moving device 213 and the ejection head moving device 214 are configured as mechanisms capable of causing movement in the three directions of X, Y, Z in the present exemplary embodiment, not both of these are necessarily capable of causing movement in the three directions for causing the movement described above. Accordingly, for example, the stage moving device 213 may be configured as a mechanism for causing movement in two directions of X and Y, and the ejection head moving device 214 may be configured as a mechanism for causing movement in one direction of Z. Alternatively, a configuration in which one of the stage moving device 213 and the ejection head moving device 214 is provided as a mechanism capable of causing movement in the three directions of X, Y, and the other is not provided may be employed.

The controller 215 is a control circuit for controlling operation of each component of the three-dimensional shaping apparatus. The controller 215 includes a CPU, a ROM, a RAM, an I/O port, and so forth. The ROM is a nonvolatile memory that stores a control program and a table of values for control. The RAM is a volatile memory used for computation and the like. The I/O port is used for communication with the outside and with components inside the apparatus. To be noted, the ROM stores a program for controlling a basic operation of the three-dimensional shaping apparatus and information of viscosity of various thermoplastic resins in association with temperature.

The computer 216 is an electronic computer provided with a storage device, a computing device, and an input/output device, and is capable of executing three-dimensional shape editing software. The computer 216 is capable of constructing a multilayer model suitable for formation using an ejection head on the basis of three-dimensional model information of a three-dimensionally shaped object to be formed and giving an instruction for sequentially forming layers to the controller 215.

The computer 216 may be a computer included in the three-dimensional shaping apparatus and an external computer capable of connecting to the three-dimensional shaping apparatus via a network or the like.

Control Blocks

Figure 15:
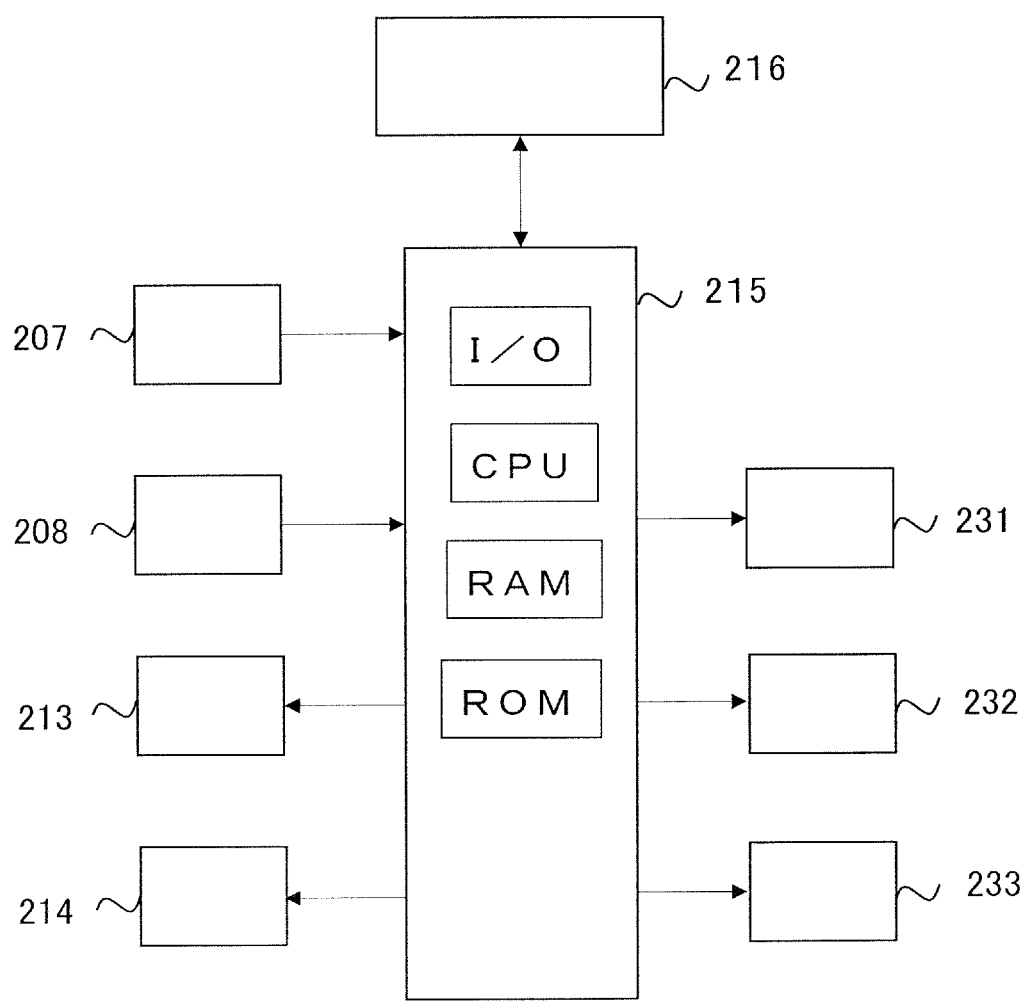
FIG. 15 is a control block diagram of a three-dimensional shaping apparatus.

FIG. 15 is a brief block diagram illustrating a connection relationship of control lines between components of the apparatus. FIG. 15 illustrates the temperature sensor 207, the infrared temperature sensor 208, the stage moving device 213, the ejection head moving device 214, the controller 215, the computer 216, a roller driving portion 231, a heater driving portion 232, and a vibrator driving portion 233.

The temperature sensor 207, the infrared temperature sensor 208, the stage moving device 213, the ejection head moving device 214, the controller 215, and the computer 216 have been already described.

The roller driving portion 231 is a circuit for driving rollers 21 and 22 included in the material introduction portion 202 of the ejection head 206, and includes a circuit for receiving a driving instruction from the controller 215, a driver circuit for driving a roller driving motor, and so forth.

The heater driving portion 232 is a circuit for driving the heater included in the heating portion 203 of the ejection head 206, and includes a power source for the heater, an electricity supply control circuit, a circuit for receiving a heating instruction from the controller 215, and so forth.

The vibrator driving portion 233 is a circuit for driving the vibrator 212 mounted on the stage 211, and includes an oscillation circuit for supplying a pulse voltage to a piezoelectric element, a circuit for receiving a vibration instruction from the controller 215, and so forth.

Three-Dimensional Shaping Process

Figure 16:
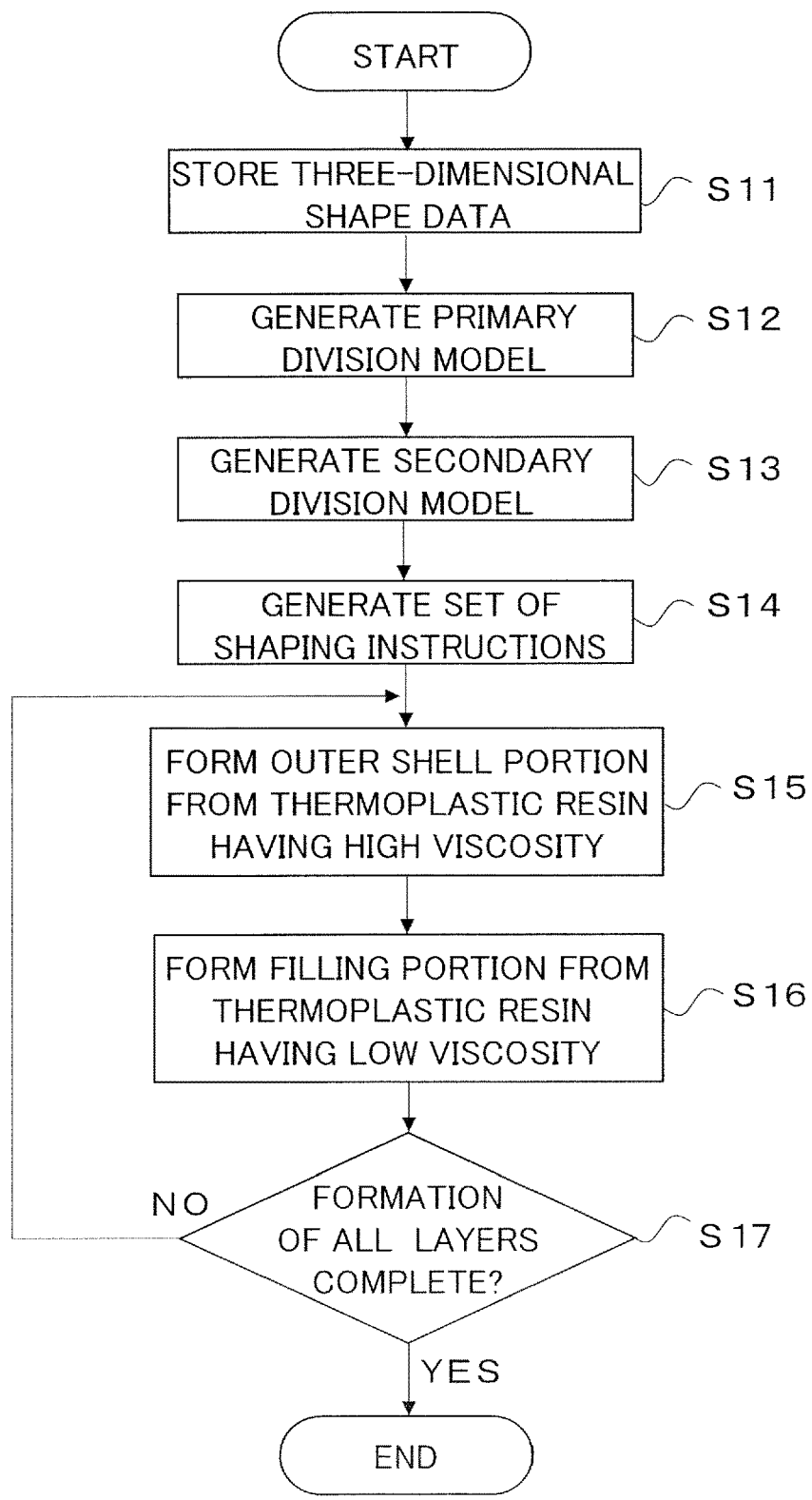
FIG. 16 is a flowchart of a three-dimensional shaping method.

Next, a three-dimensional shaping process of the present exemplary embodiment will be described step by step. FIG. 16 is a flowchart illustrating the order of steps in the three-dimensional shaping process of the present exemplary embodiment.

First, in step S10, three-dimensional shape data of a three-dimensional model to be shaped is stored in the computer 216. The three-dimensional shape data may be data generated by the computer 216, and may be data generated by a CAD system or a three-dimensional shape measurement apparatus and input via a network or a recording medium. Although a STEP format, a parasolid format, an STL format, or the like is used as the format of the three-dimensional shape data, the kind of the format is not limited as long as the three-dimensional shape can be expressed as digital data.

Next, in steps S12 and S13, the computer 216 generates, on the basis of the three-dimensional shape data, shape data of each layer to be used for forming a three-dimensional model by piling up plural layers.

In step S12, the computer 216 generates a primary division model by using the computational device included therein and the three-dimensional shape editing software. In the primary division model, a three-dimensional model shape is divided by the thickness of one layer that can be deposited by the three-dimensional shaping apparatus of the present exemplary embodiment.

Figure 17A:
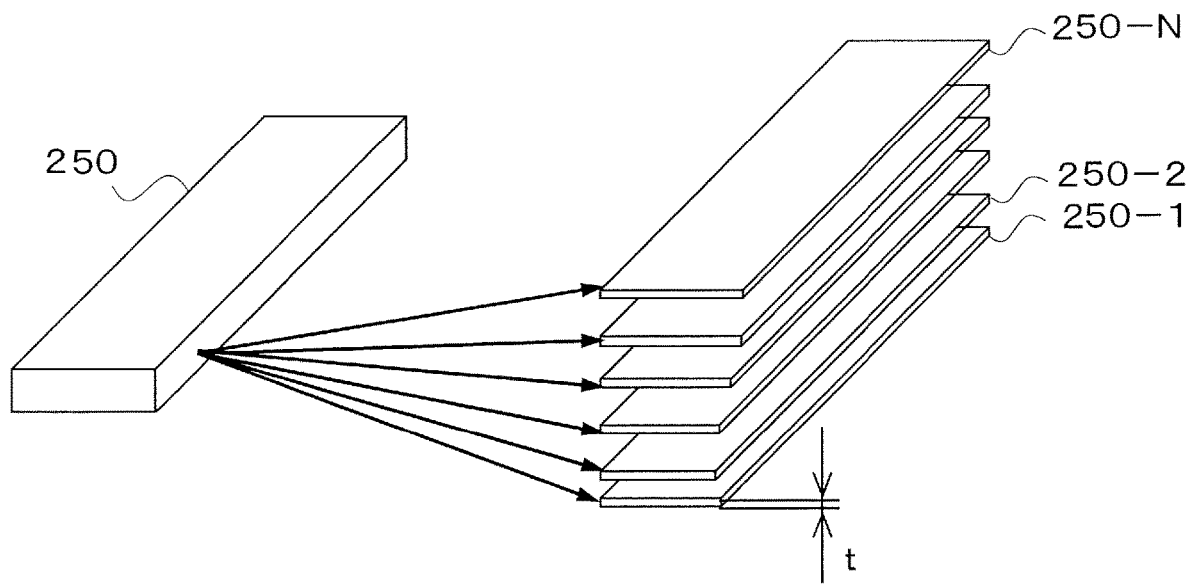
FIG. 17A illustrates an example of a primary division model.

For example, in the case where the three-dimensional model to be shaped is a rectangular parallelepiped 250 as illustrated in FIG. 17A, the three-dimensional model is divided by the thickness t of one layer that can be deposited by the three-dimensional shaping apparatus. For the sake of convenience of description, N layers into which the three-dimensional model has been divided will be referred to as a layer 250-1, a layer 250-2 ... and a layer 250-N in this order from the bottom to the top.

In step S13, the computer 216 generates a secondary division model in which each of the layers 250-1 to 250-N is divided into a portion including the surface of the three-dimensionally shaped object and a portion adjacent to the portion including the surface on the inner side. To be noted, for the sake of convenience of description, the portion including the surface of the three-dimensionally shaped object will be sometimes referred to as an outer shell portion and the portion adjacent to the portion including the surface on the inner side will be sometimes referred to as a filling portion.

Figure 17B:
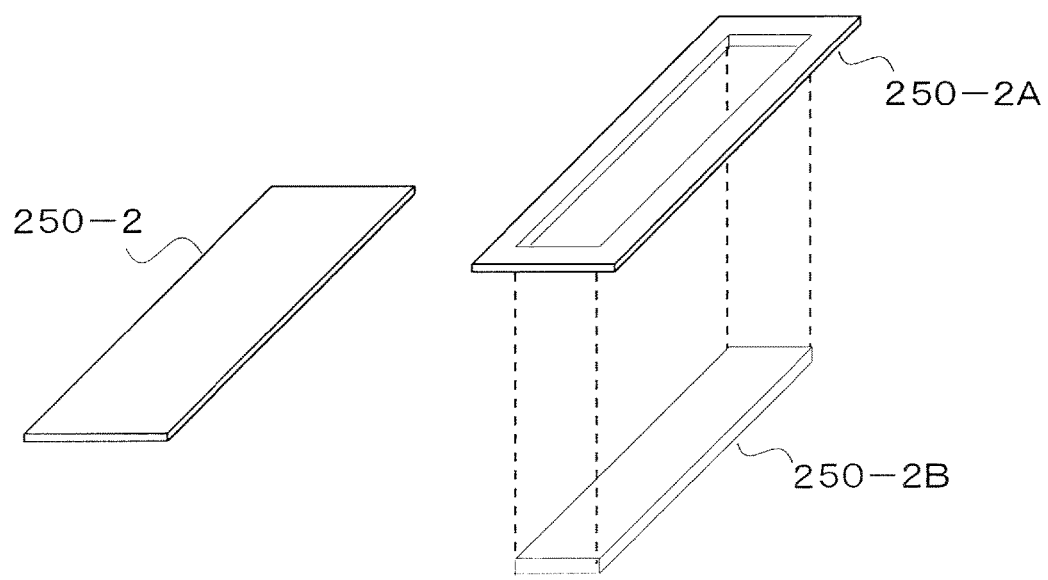
FIG. 17B illustrates an example of a secondary division model.

Taking the layer 250-2 that is the second layer of the primary division model as an example, although the outer periphery portion of the layer constitutes the outer surface of the three-dimensional model, the other portion thereof does not constitute the surface of the three-dimensional model. Therefore, as illustrated in FIG. 17B, the computer 216 divides the layer 250-2 into a layer 250-2A and a layer 250-2B.

Here, the layer 250-2A corresponds to the outer periphery portion of the layer 250-2 constituting the side surfaces, that is, the outer shell portion, of the three-dimensional model. The width w of the layer 250-2A is equal to or an integer multiple of the width of a line that can be drawn by a thermoplastic resin having a high viscosity, and corresponds to the thickness of the outer shell portion. In addition, the layer 250-2B is a portion obtained by excluding the layer 250-2A, which is a portion including the outer surface of the three-dimensional model, from the layer 250-2. In other words, the layer 250-2B is a filling portion that is a portion in contact with the layer 250-2A.

In step S14, the computer 216 generates a set of instructions required for the three-dimensional shaping apparatus to shape the three-dimensional model with reference to the secondary division model generated in step S13, and transmits the set of instructions to the controller 215. To be noted, a configuration in which the computer 216 transmits the secondary division model to the controller 215 and the controller 215 generates the set of instructions required for shaping may be also employed.

The set of instructions includes procedures from deposition of the first layer to deposition of the N-th layer, and is configured as instructions for first forming the portion constituting the surface of the three-dimensionally shaped object from a thermoplastic resin having a high viscosity and then forming the portion adjacent to the portion constituting the surface on the inner side from a thermoplastic resin having a low viscosity. For example, a set of instructions for forming the layer 250-2 that is the second layer of the primary division model is configured as a set of instructions for first forming the layer 250-2A that is the portion constituting the outer surface of the three-dimensionally shaped object and then forming the layer 250-2B that is the portion adjacent to the layer 250-2A.

Figure 18A:
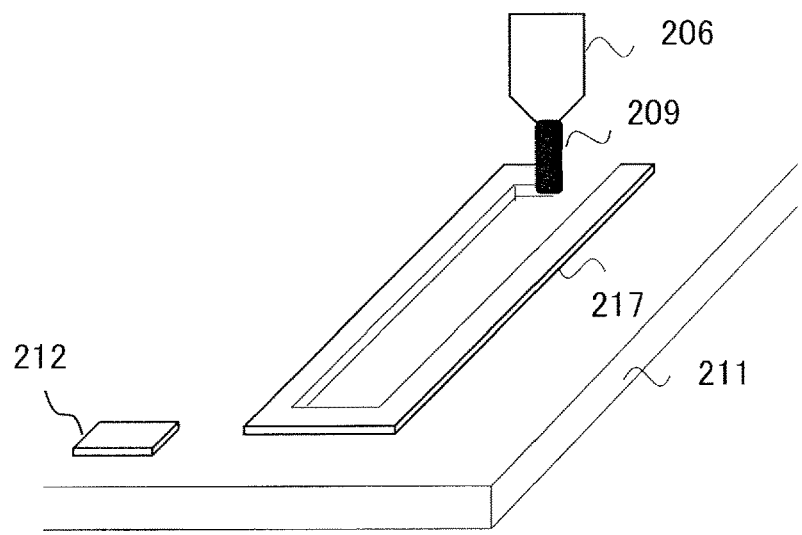
FIG. 18A illustrates a state when a portion constituting a surface is being formed from a thermoplastic resin having a high viscosity.

Next, in step S15, the controller 215 operates each component of the apparatus in accordance with the set of instructions, and, for example, forms the portion constituting the surface of the three-dimensionally shaped object from a thermoplastic resin having a high viscosity as illustrated in FIG. 18A.

The controller 215 drives the roller driving portion 231 to supply an appropriate amount of unfused filament of thermoplastic resin to the heating portion 203. The controller 215 drives the heater driving portion 232 to heat and fuse the filament of thermoplastic resin. At this time, the controller 215 refers to a measurement value of the temperature sensor 207, and performs feedback control of the heater driving portion 232 such that the viscosity of the thermoplastic resin is in a range from 1100 Pa·S to 3000 Pa·S. The controller 215 stores in advance information about the viscosity of thermoplastic resin in association with temperature, and is capable of adjusting the viscosity to a desired value by controlling the temperature of the thermoplastic resin by performing feedback control of driving of the heater driving portion 232 on the basis of a measurement value of the temperature sensor 207.

The controller 215 forms the outer shell portion from the thermoplastic resin having a viscosity of 1100 Pa·S to 3000 Pa·S by relatively moving the ejection head 206 and the stage 211 as illustrated in FIG. 18A. Since the viscosity of the thermoplastic resin is set to be high, when drawing a pattern by relatively scanning the ejection head 206, the pattern is not likely to slacken, and thus a high precision of shape can be ensured. By measuring the temperature of the thermoplastic resin immediately after being ejected by using the infrared temperature sensor 208 and giving feedback to heater driving while the thermoplastic resin is ejected through the ejection port 205, the controller 215 can control the viscosity with a high precision.

Figure 18B:
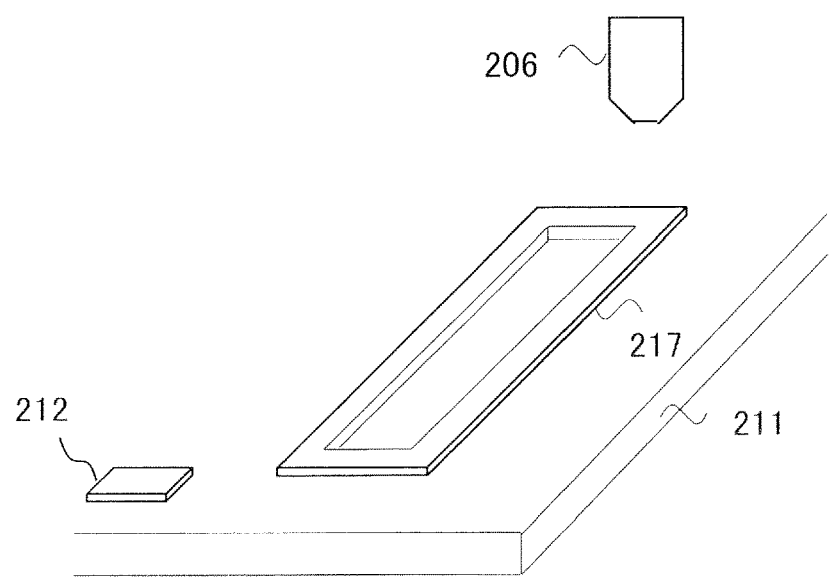
FIG. 18B illustrates a state in which the portion constituting the surface has been formed.

As illustrated in FIG. 18B, after forming the pattern of the portion constituting the outer surface of the three-dimensional model from a thermoplastic resin having a high viscosity, the controller 215 temporarily stops the ejection of thermoplastic resin through the ejection head 206.

Figure 19A:
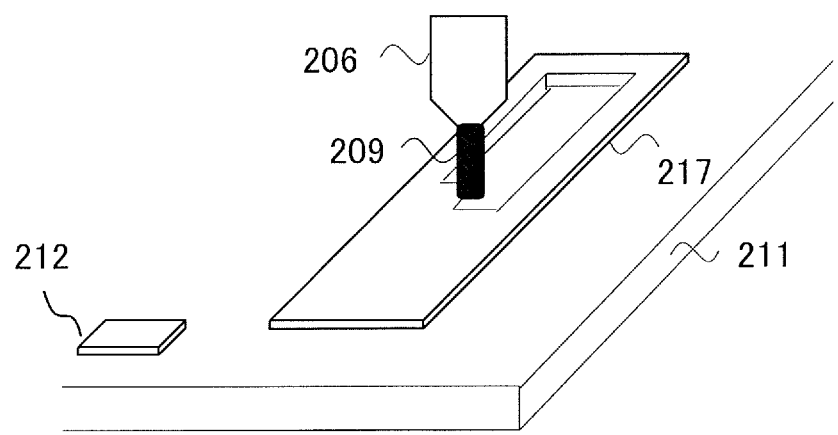
FIG. 19A illustrates a state when a portion in contact with the portion constituting a surface is being formed from a thermoplastic resin having a low viscosity.

Next, in step S16, the controller 215 operates each component of the apparatus in accordance with the set of instructions, and forms the portion adjacent to the portion constituting the surface of the three-dimensionally shaped object from a thermoplastic resin having a low viscosity, for example, as illustrated in FIG. 19A. Since the portion constituting the surface of the three-dimensionally shaped object has been already formed in step S15, a thermoplastic resin having a viscosity of 500 Pa·S to 1000 Pa·S is applied in a region surrounded by the portion constituting the surface, and thus the filling portion is formed.

The controller 215 drives the roller driving portion 231 to supply an appropriate amount of unfused filament of thermoplastic resin to the heating portion 203. Since the amount of ejection of the thermoplastic resin having a low viscosity per unit time can be set to be larger than the amount of ejection of the thermoplastic resin having a high viscosity per unit time, the supply speed of filament can be set to be higher in step S16 than in step S15. The controller 215 drives the heater driving portion 232 to heat and fuse the filament of thermoplastic resin. At this time, the controller 215 refers to a measurement value of the temperature sensor 207, and performs feedback control of the heater driving portion 232 such that the viscosity of the thermoplastic resin is in a range from 500 Pa·S to 1000 Pa·S.

The controller 215 relatively moves the ejection head 206 and the stage 211, and forms a pattern from the thermoplastic resin having a viscosity of 500 Pa·S to 1000 Pa·S as illustrated in FIG. 19A. Since the viscosity of the thermoplastic resin is set to be low, the thermoplastic resin is likely to get into recesses even in the case where the surface of the base has irregularity, and thus hardly any gap is likely to occur when relatively scanning the ejection head 206 to draw a pattern. In addition, since a layer having a top surface with a high flatness is formed when the viscosity is set to be low, the layer can serve as a base with a high flatness when further forming an upper layer on this layer. Therefore, a three-dimensionally shaped object in which adhesion between layers is very firm and which is structurally strong can be formed.

By measuring the temperature of the thermoplastic resin immediately after being ejected by using the infrared temperature sensor 208 and giving feedback to heater driving while the thermoplastic resin is ejected through the ejection port 205, the controller 215 can control the viscosity with a high precision. To be noted, although the viscosity of the resin can be changed by only controlling the electricity of the heater without using either of the temperature sensor 207 and the infrared temperature sensor 208, in this case, the relationship between supplied electricity and the viscosity of the resin needs to be stored in the controller 215 in advance. Since generally the viscosity of thermoplastic resin is lower when the temperature is higher, the temperature of the thermoplastic resin in the step of forming the portion serving as the surface of the three-dimensionally shaped object is lower than the temperature of the thermoplastic resin in the step of forming the filling portion of the three-dimensionally shaped object.

Further, in the present exemplary embodiment, the vibrator 212 mounted on the stage 211 is driven when forming a pattern from the thermoplastic resin having a viscosity of 500 Pa·S to 1000 Pa·S. This vibrates the stage 211 to improve the fluidity of the thermoplastic resin, and thus promotes the thermoplastic resin getting in the recesses of the base. The three-dimensionally shaped object being formed can be separated from the stage 211 when the vibrator 212 is driven at an excessively large amplitude, and thus the driving condition and placement of the vibrator 212 is preferably adjusted as appropriate.

Figure 19B:
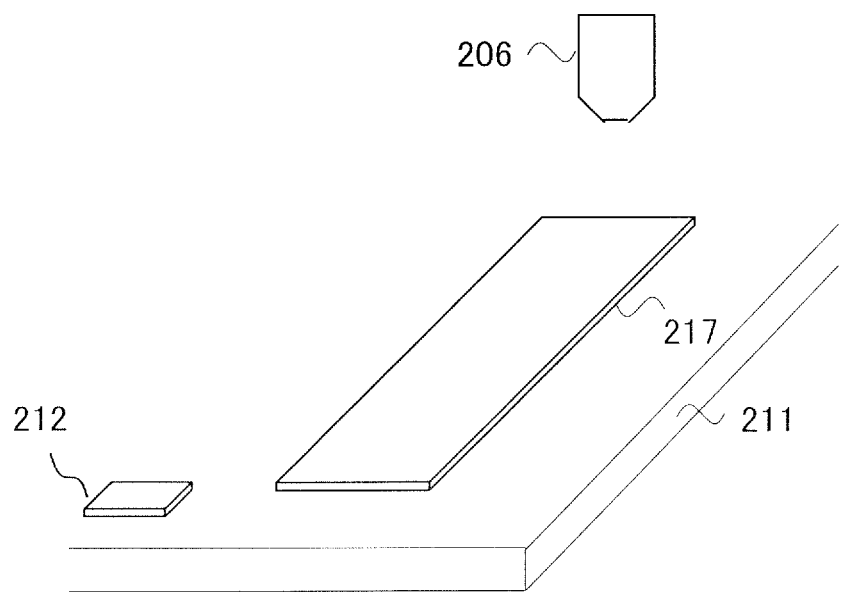
FIG. 19B illustrates a state in which the portion in contact with the portion constituting the surface has been formed.

As illustrated in FIG. 19B, three-dimensional shaping of one layer of the primary division model generated in step S12 is completed in steps S15 and S16 described above as illustrated in FIG. 19B.

In step S17, the controller 215 determines whether three-dimensional shaping of all N layers of the primary division model has been completed. In the case where the three-dimensional shaping is not completed, steps S15 and S16 are performed again. In the case where the three-dimensional shaping is completed, the three-dimensional shaping process is finished.

According to the present exemplary embodiment, by forming the portion serving as the surface of the three-dimensionally shaped object from a thermoplastic resin having a high viscosity of 1100 Pa·S to 3000 Pa·S, the outer surface of the three-dimensionally shaped object can be shaped with a high precision of shape.

Further, according to the present exemplary embodiment, by forming the portion adjacent to the portion serving as the surface on the inner side from a thermoplastic resin having a low viscosity of 500 Pa·S to 1000 Pa·S, occurrence of gap between layers can be suppressed. Since the viscosity of the thermoplastic resin is set to be low, the thermoplastic resin is likely to get into recesses even in the case where the surface of the base has irregularity, and thus hardly any gap is likely to occur between layers when relatively scanning the ejection head 206 to draw a pattern. In addition, since a layer having a top surface with a high flatness is formed when the viscosity is set to be low, the layer can serve as a base with a high flatness when further forming an upper layer on this layer. Therefore, a three-dimensionally shaped object in which adhesion between layers is very firm and which is structurally strong can be formed.

According to the present exemplary embodiment, since the portion serving as the outer surface is formed from a thermoplastic resin having a high viscosity in advance and then the portion surrounded thereby is formed from a thermoplastic resin having a low viscosity, the thermoplastic resin having a low viscosity does not stick out, and thus a high precision of shape can be achieved. In addition, since a large amount of the thermoplastic resin having a low viscosity can be ejected per unit time, the total time required for three-dimensional shaping can be shortened.

In addition, according to the present exemplary embodiment, by vibrating the stage when applying the thermoplastic resin having a low viscosity, the fluidity of the thermoplastic resin is increased, and thus occurrence of gap in the filling portion of the three-dimensionally shaped object can be effectively suppressed.

Fourth Exemplary Embodiment

A configuration of a three-dimensional shaping apparatus and a three-dimensional shaping method according to a fourth exemplary embodiment of the present invention will be described.

In the three-dimensional shaping apparatus of the third exemplary embodiment, the same ejection head is used, the viscosity of the thermoplastic resin is changed by changing the temperature of the heating portion of the ejection head, and thus patterns are sequentially formed by using thermoplastic resins of a high viscosity and a low viscosity. In contrast to this, in the fourth exemplary embodiment, a configuration in which plural ejection heads are provided, and thermoplastic resins of different viscosities are ejected through respective ejection heads is employed.

Configuration of Apparatus

Figure 20:
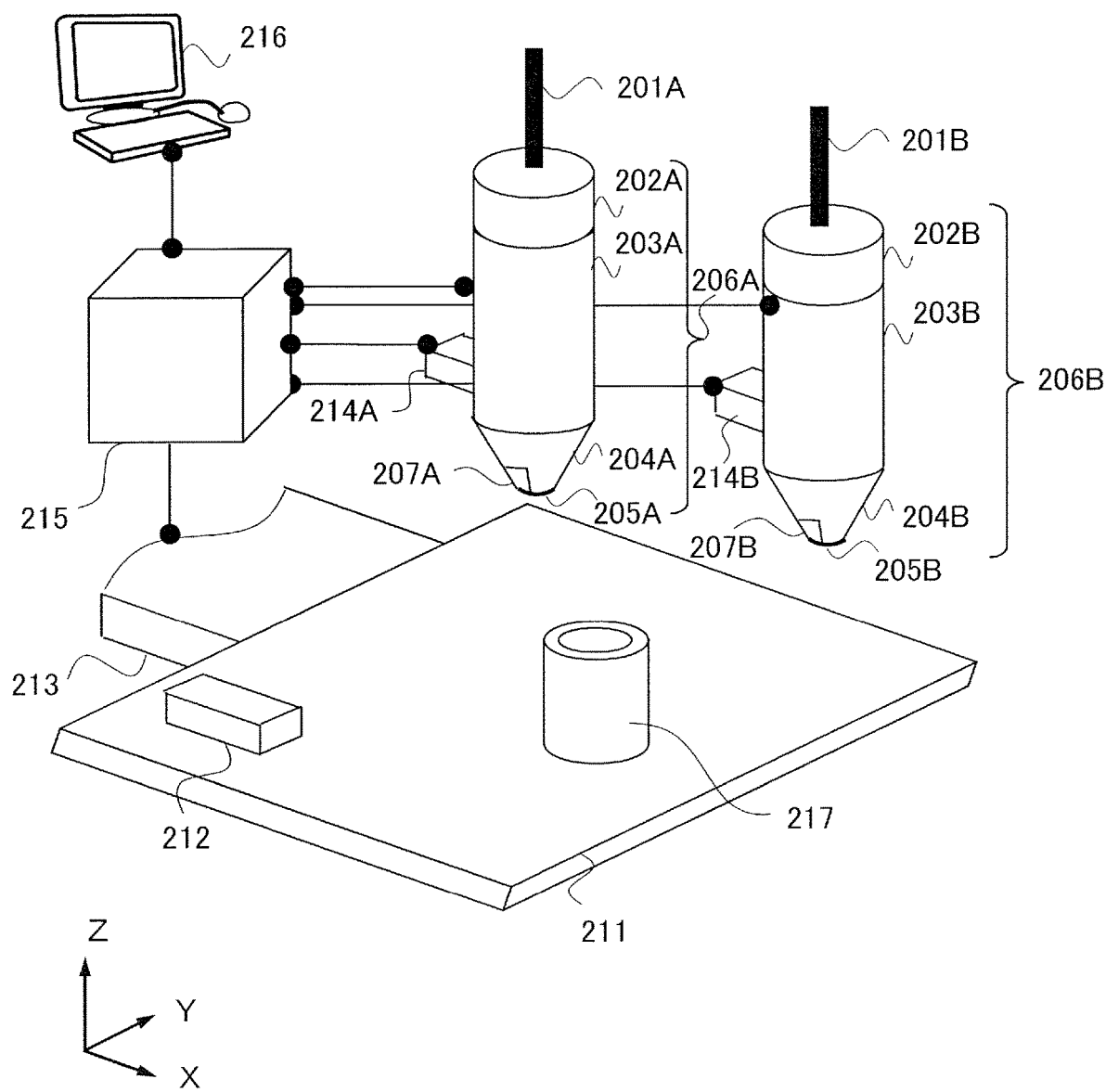
FIG. 20 is a perspective view of a three-dimensional shaping apparatus of a fourth exemplary embodiment.

FIG. 20 is a schematic perspective view of the three-dimensional shaping apparatus according to the fourth exemplary embodiment of the present invention.

FIG. 20 illustrates a stage 211, a vibrator 212, a stage moving device 213, a controller 215, a computer 216, and a three-dimensionally shaped object 217. Since these components are the same as in the third exemplary embodiment, descriptions thereof will be omitted.

In the present exemplary embodiment, two ejection heads 206A and 206B are provided. Filament-shaped shaping materials 201A and 201B are respectively supplied to the ejection heads 206A and 206B, and illustration of reels is omitted. The ejection head 206A includes a material introduction portion 202A, a heating portion 203A, an ejection nozzle 204A, an ejection port 205A, an ejection head 206A, and a temperature sensor 207A. Similarly, the ejection head 206B includes a material introduction portion 202B, a heating portion 203B, an ejection nozzle 204B, an ejection port 205B, an ejection head 206B, and a temperature sensor 207B.

The ejection head 206A is an ejection head for forming the outer shell portion including the surface of the three-dimensionally shaped object that ejects a thermoplastic resin having a high viscosity, that is, a viscosity of 1100 Pa·S to 3000 Pa·S.

The ejection head 206B is an ejection head for forming the filling portion of the three-dimensionally shaped object that ejects a thermoplastic resin having a low viscosity, that is, a viscosity of 500 Pa·S to 1000 Pa·S.

The ejection heads 206A and 206B are controlled independently from each other by the controller 215, and are capable of respectively moved by ejection head moving devices 214A and 214B independently from each other.

Control Blocks

In the third exemplary embodiment, as illustrated in FIG. 15, the temperature sensor 207, the roller driving portion 231, the heater driving portion 232, and the ejection head moving device 214 are connected to the controller 215 for controlling one ejection head. In the present exemplary embodiment, although illustration is omitted herein, the controller 215 is connected to temperature sensors, roller driving portions, heater driving portions, and ejection head moving devices respectively provided for the ejection heads 206A and 206B, and controls the ejection heads 206A and 206B independent from each other.

Three-Dimensional Shaping Process

Also in the present exemplary embodiment, a three-dimensional shaping process is performed in accordance with the flowchart of FIG. 16. However, in the three-dimensional shaping apparatus of the third exemplary embodiment, the viscosity of the thermoplastic resin is controlled by changing the temperature of the heating portion 203 of a single ejection head when performing steps S15 and S16. Therefore, in some case, it takes time to change and stabilize the viscosity when alternately forming the outer shell portion and the filling portion by switching the high viscosity and the low viscosity.

In contrast to this, in the apparatus of the present exemplary embodiment, the heating portion of the ejection head 206A controls the temperature of the thermoplastic resin such that the viscosity is high, that is, from 1100 Pa·S to 3000 Pa·S, the whole time. Similarly, the ejection head 206B controls the temperature of the thermoplastic resin such that the viscosity is low, that is, from 500 Pa·S to 1000 Pa·S, the whole time.

Accordingly, the apparatus of the present exemplary embodiment including the ejection heads 206A and 206B does not require time to wait for the change of viscosity and can quickly form layers because the apparatus of the present exemplary embodiment switches the ejection head to be used when alternately forming the outer shell portion and the filling portion.

In addition, in the present exemplary embodiment, the outer shell portion and the filling portion can be formed by using different kinds of thermoplastic resins, and, for example, the outer shell portion and the filling portion can be formed from materials having different colors or different glossiness.

Also in the present exemplary embodiment, similarly to the third exemplary embodiment, the outer surface of the three-dimensionally shaped object can be shaped with a high precision of shape by forming the portion serving as the surface of the three-dimensionally shaped object from a thermoplastic resin having a high viscosity of 1100 Pa·S to 3000 Pa·S.

Further, also in the present exemplary embodiment, by forming the portion adjacent to the portion serving as the surface on the inner side from a thermoplastic resin having a low viscosity of 500 Pa·S to 1000 Pa·S, occurrence of gap between layers can be suppressed. Since the viscosity of the thermoplastic resin is set to be low, the thermoplastic resin is likely to get into recesses even in the case where the surface of the base has irregularity, and thus hardly any gap is likely to occur between layers when relatively scanning the ejection head 206 to form the filling portion. In addition, since a layer having a top surface with a high flatness is formed when the viscosity is set to be low, the layer can serve as a base with a high flatness when further forming an upper layer on this layer. Therefore, a three-dimensionally shaped object in which adhesion between layers is very firm and which is structurally strong can be formed.

Also in the present exemplary embodiment, since the portion serving as the outer surface is formed from a thermoplastic resin having a high viscosity in advance and then the portion surrounded thereby is formed from a thermoplastic resin having a low viscosity, the thermoplastic resin having a low viscosity does not stick out, and thus a high precision of shape can be achieved. In addition, since a large amount of the thermoplastic resin having a low viscosity can be ejected per unit time, the total time required for three-dimensional shaping can be shortened.

In addition, also in the present exemplary embodiment, by vibrating the stage when applying the thermoplastic resin having a low viscosity, the fluidity of the thermoplastic resin is increased, and thus occurrence of a gap in the filling portion of the three-dimensionally shaped object can be effectively suppressed.

To be noted, although an apparatus including two ejection heads is illustrated in FIG. 20, the number of ejection heads included in the apparatus is not limited to this, and a three-dimensional shaping apparatus including more ejection heads may be employed.

Fifth Exemplary Embodiment

In the third exemplary embodiment and the fourth exemplary embodiment, as illustrated in FIGS. 18 and 19, from the bottom layer to the top layer of the primary division model, each layer is formed by first forming the outer shell portion and then forming the filling portion.

In contrast to this, in the fifth exemplary embodiment, plural layers of the portion including the surface, that is, the outer shell portion, of the three-dimensionally shaped object are first deposited, and then the portion adjacent to the portion including the surface on the inner side, that is, the filling portion, is formed.

To be noted, also in the present exemplary embodiment, the outer shell portion of the three-dimensionally shaped object is formed from a thermoplastic resin having a viscosity of 1100 Pa·S to 3000 Pa·S. In addition, the filling portion is formed from a thermoplastic resin having a viscosity of 500 Pa·S to 1000 Pa·S. Differences of the fifth exemplary embodiment from the third exemplary embodiment and the fourth exemplary embodiment will be described below by comparing these embodiments.

Figure 21A:
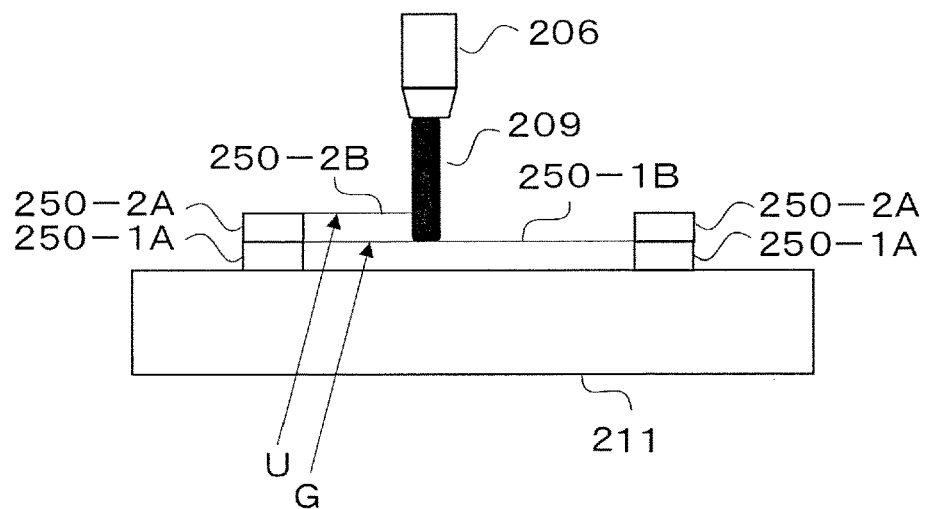
FIG. 21A illustrates a formation process of the third and fourth exemplary embodiments.
Figure 21B:
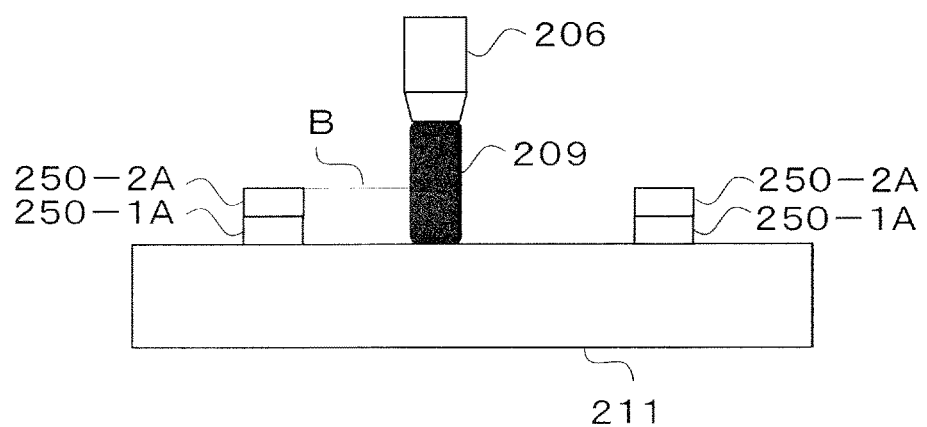
FIG. 21B illustrates a formation process of a fifth exemplary embodiment.

FIG. 21A is a section view illustrating an example of a formation procedure described in the third exemplary embodiment and the fourth exemplary embodiment, and FIG. 21B is a section view illustrating an example of a formation procedure of the fifth exemplary embodiment.

FIG. 21A illustrates a state in which the first layer 250-1A of the outer shell portion, the first layer 250-1B of the filling portion, and the second layer 250-2A of the outer shell portion have been formed on the stage 211 in this order, and the second layer 250-2B of the filling portion is being formed by the ejection head 206. As has been described, the filling portion is formed from a thermoplastic resin having a lower viscosity than the outer shell portion, and thus occurrence of a gap at a boundary portion G between layers can be suppressed. In addition, since the filling portion is formed from a thermoplastic resin having a low viscosity, the flatness of an upper surface U is improved. By vibrating the stage 211 at an appropriate amplitude by using the vibrator 212, these effects are enhanced.

In contrast, FIG. 21B illustrates a state in which a filling portion corresponding to two layers is being formed by the ejection head 206 after completing formation of the first layer 250-1A of the outer shell portion, and the second layer 250-2A of the outer shell portion on the stage 211 in this order. In the present exemplary embodiment, the layers 250-1B and 250-2B of the filling portion are not formed separately but formed at the same time, and thus no gap between these two layers occurs. Since the filling portion is formed from a thermoplastic resin having a lower viscosity than the outer shell portion also in the present exemplary embodiment, the flatness of an upper surface is improved. Moreover, since the third layer and subsequent layers of the filling portion are also formed from a thermoplastic resin having a low viscosity, occurrence of a gap at boundaries between layers can be suppressed.

To be noted, the formation procedure of the fifth exemplary embodiment described above can be also executed by an apparatus including a single ejection head illustrated in FIG. 14 and an apparatus including plural ejection heads illustrated in FIG. 20. However, to form the filling portion corresponding to two layers in a short time, it is preferable that the area of the ejection port of the ejection head used for ejecting a thermoplastic resin having a low viscosity is larger than the area of the ejection port of the ejection head used for ejecting a thermoplastic resin having a high viscosity to form the outer shell portion.

To be noted, although the filling portion corresponding to two layers is formed altogether after forming two layers of the outer shell portion in the example of FIG. 21B, the number of layers is not limited to this example, and, for example, the filling portion may be formed after forming three layers of the outer shell portion.

In addition, vibrating a stage by using a vibrator at an appropriate amplitude at the time of forming the filling portion from a thermoplastic resin having a low viscosity is effective also in the present exemplary embodiment.

Sixth Exemplary Embodiment

Although the part of the outer surface of the three-dimensionally shaped object formed from a thermoplastic resin having a high viscosity may be only the side surfaces, to ensure the precision of shape, it is preferable that also the bottom surface and top surface are formed from the thermoplastic resin having a high viscosity.

In the sixth exemplary embodiment, the whole of the outer surface of the three-dimensionally shaped object is formed from a thermoplastic resin having a high viscosity.

Figure 22A:
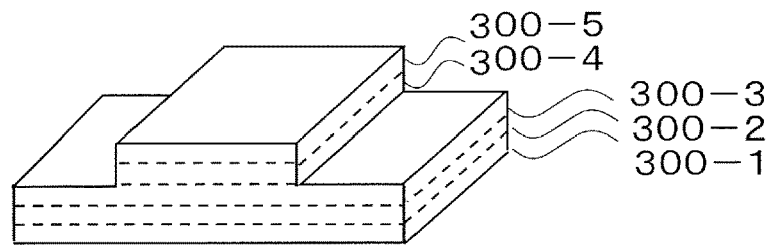
FIG. 22A illustrates a method of primary division of a sixth exemplary embodiment.

FIG. 22A illustrates an example of a three-dimensional shaping model, and dividing planes for dividing the three-dimensional shaping model into five layers 300-1, 300-2, 300-3, 300-4, and 300-5 in step S12 of the flowchart of FIG. 16 are indicated by dot lines.

Figure 22B:
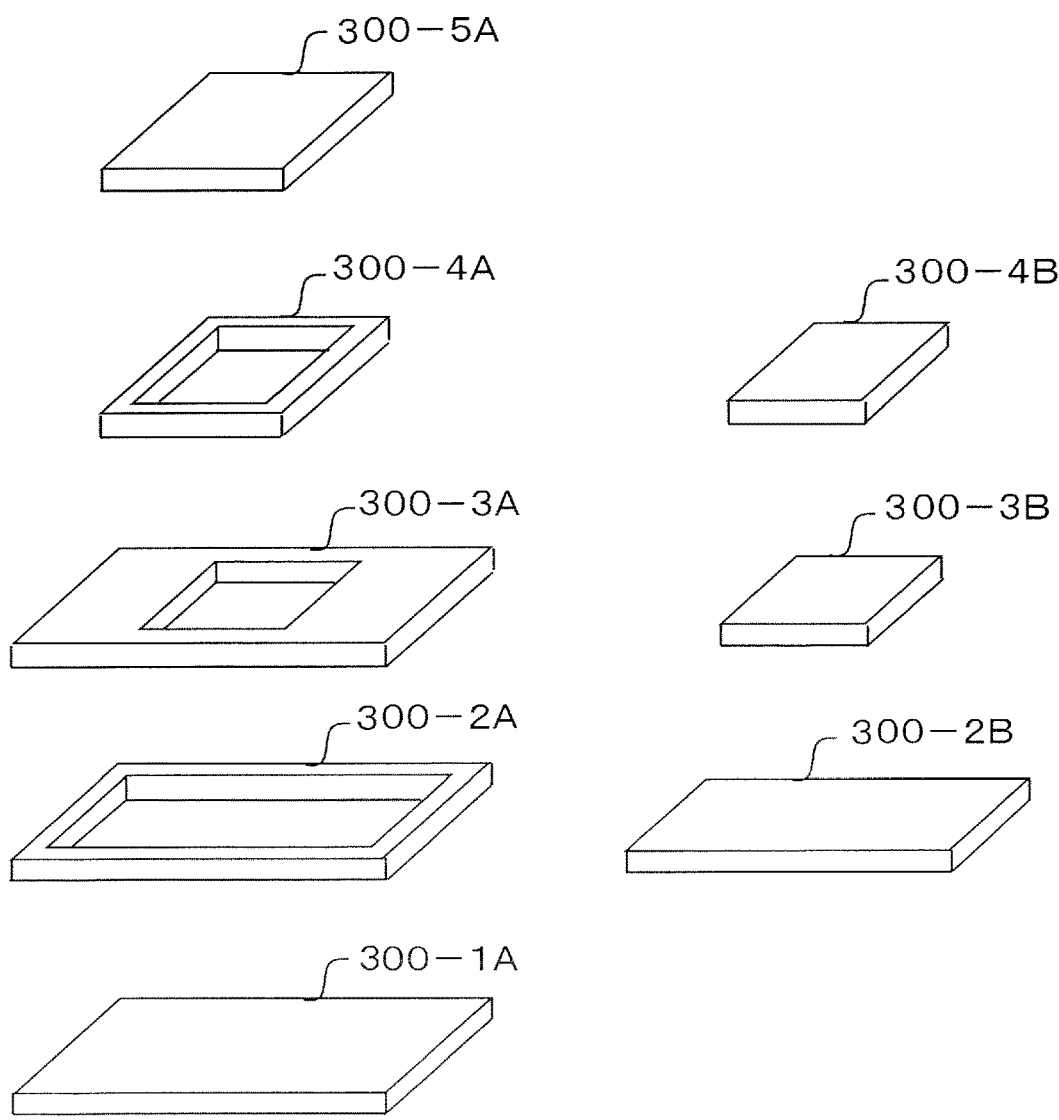
FIG. 22B illustrates a method of secondary division of the sixth exemplary embodiment.

In addition, FIG. 22B illustrates eight portions of the secondary division model generated in step S13. In FIG. 22B, portions including the surface of the three-dimensionally shaped object, that is, portions constituting the outer shell portion and formed from a thermoplastic resin having a viscosity of 1100 Pa·S to 3000 Pa·S are indicated by adding A to the ends of the reference signs thereof. In addition, portions adjacent to the portions including the surface of the three-dimensionally shaped object on the inner side, that is, portions constituting the filling portion and formed from a thermoplastic resin having a viscosity of 500 Pa·S to 1000 Pa·S are indicated by adding B to the ends of the reference signs thereof.

The three-dimensionally shaped object is formed by depositing layers 300-1A, 300-2A, 300-2B, 300-3A, 300-3B, 300-4A, 300-4B, and 300-5A in this order.

The shaping may be performed by the three-dimensional shaping apparatus of FIG. 14 described in the third exemplary embodiment, the three-dimensional shaping apparatus of FIG. 20 described in the fourth exemplary embodiment, and other apparatuses.

According to the present exemplary embodiment, not only the side surfaces but also one or both of the bottom surface and top surface of the three-dimensionally shaped object is formed from a thermoplastic resin having a high viscosity of 1100 Pa·S to 3000 Pa·S. Therefore, the precision of the outer shape can be improved, and a uniform appearance with less variation of states of surfaces can be achieved.

Example 7

An example of shaping using the three-dimensional shaping apparatus of FIG. 14 will be described.

As a material of the shaping material 201, an ABS resin 3001 M manufactured by UMG ABS, LTD. was used.

The material was shaped into a filament having a length of about 100 m and a circular section of Φ=1.75 mm by using a single-screw extruder UT-25-TL manufactured by Research Laboratory of Plastics Technology Co., Ltd. that is not illustrated with a number of screw rotations of 50 rpm, at a cylinder temperature of 193° C., and with a resin pressure of 7.9 MPa.

As the computer 216 illustrated in FIG. 14, PC-MY30XEZE3 manufactured by NEC Corporation was used. In addition, on the computer, KISSlicer Ver. 1.1.0 was used as the three-dimensional shape editing software, and ARDUINO Ver. 1.0.6 was used as the control software.

As the temperature sensor 207 illustrated in FIG. 14, a bayonet-type sheath thermocouple T-212SH manufactured by RKC Instrument INC. that can be used at a high temperature was used.

Figure 23:
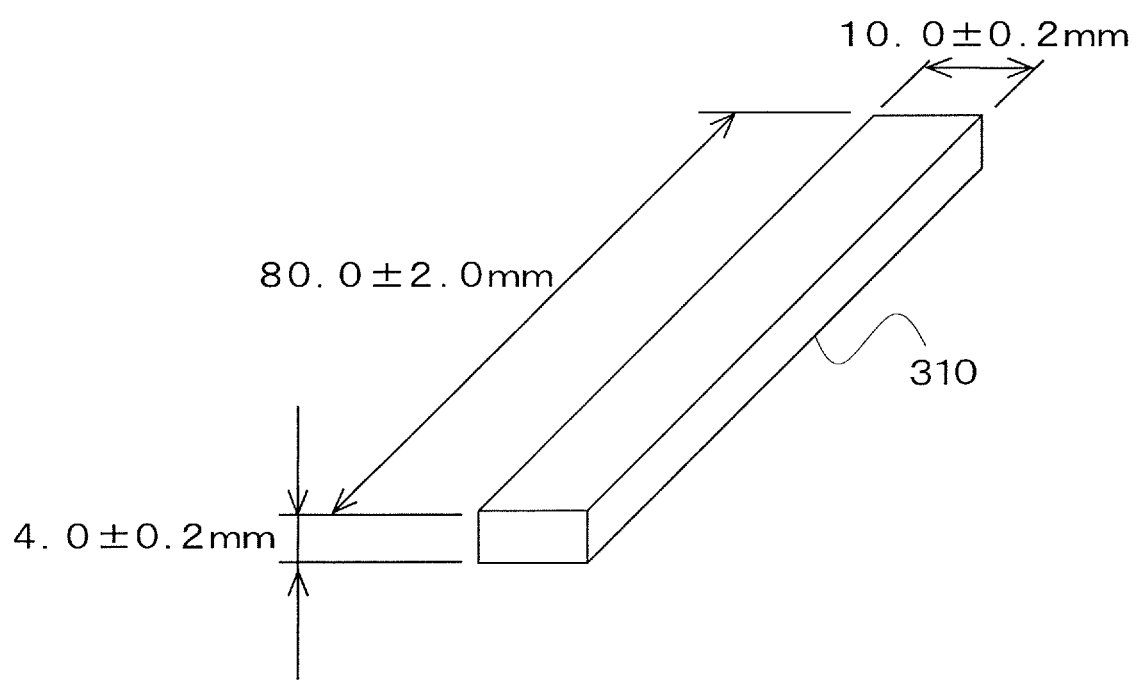
FIG. 23 is a perspective view of a three-dimensional model of an example illustrating a shape thereof.

FIG. 23 illustrates the shape of a three-dimensional model 310. To be noted, the shape of the three-dimensional model 310 is the same as the shape described in "6.1.2 Recommended Specimen" of JIS K 7171. That is, the length is 80.0±2.0 mm, the width is 10.0±0.2 mm, and the thickness is 4.0±0.2 mm.

First, in Example 7, a relationship between temperature (° C.) and viscosity (Pa·S) of the ABS resin to be used was obtained. The measurement was performed in accordance with "Test method of fluidity property of plastic by plastic-capillary rheometer and slit die rheometer" of JIS K 7199. The shear rate was set to 100 (1/s) in the measurement. The results of the measurement are shown in FIG. 24.

Next, shaping of the three-dimensional model 310 illustrated in FIG. 23 was performed by using the three-dimensional shaping apparatus of FIG. 14. The outer shell portion and the filling portion were formed by using different combinations of viscosities of thermoplastic resin, and the strength of the three-dimensionally shaped object was checked.

Figure 24:
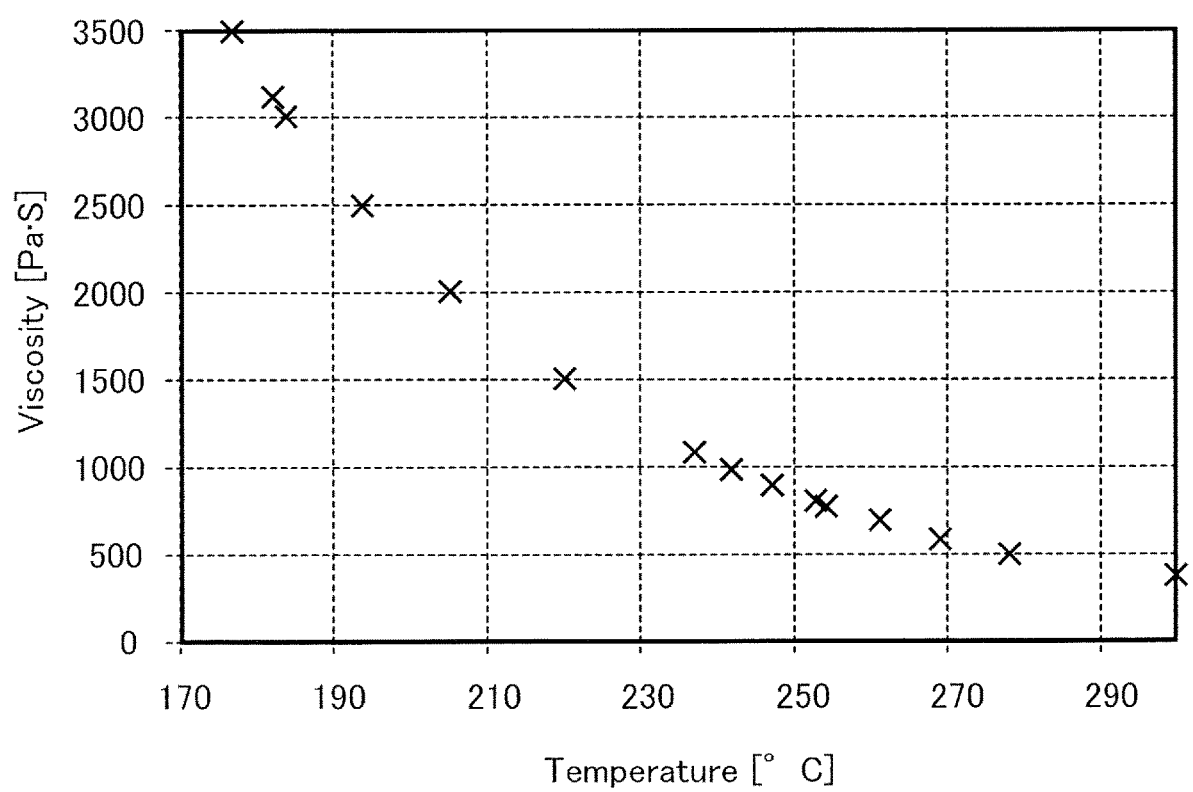
FIG. 24 is a graph illustrating a temperature-viscosity characteristic of a thermoplastic resin of an example.

The viscosities of thermoplastic resin for forming the outer shell portion and the filling portion were set in accordance with the relationship between temperature (° C.) and viscosity (Pa·S) of the ABS resin illustrated in FIG. 24, the temperature of the fused resin 209 was measured by the temperature sensor 207 and the infrared temperature sensor 208, and feedback control of the heating portion 203 was performed.

The set values are shown in Table 3.

TABLE 3

| Viscosity (Pa · S) | 400 | 500 | 600 | 900 | 1000 | 1100 |
|---|---|---|---|---|---|---|
| Temperature (° C.) | 300 | 278 | 269 | 247 | 242 | 236 |
| Viscosity (Pa · S) | 1500 | 2000 | 2500 | 3000 | 3500 | |
| Temperature (° C.) | 220 | 205 | 194 | 183 | 176 | |

The three-dimensional model 310 having a height of 4.0 mm was divided into sixteen layers, and thus the height of a unit layer was 0.25 mm. The diameter of the ejection port 205 was adjusted such that the extruded resin was deposited to a height of 0.25 mm and a width of 0.5 mm at the time of shaping the outer shell portion.

First, the temperature of the heating portion 203 was adjusted such that the viscosity of the fused resin 209 was 1100 Pa·S, and the outer shell portion of 80 mm×10 mm was shaped. Next, the temperature of the heating portion 203 was raised and adjusted such that the viscosity of the fused resin 209 was 500 Pa·S, and the filling portion was formed inside the outer shell portion. In the formation of the filling portion, the ejection head was relatively scanned in a zig-zag manner such that the fused resin 209 that was extruded filled inside of the frame of the outer shell portion without a gap and thus formed a unit layer. Subsequently, the temperature of the heating portion 203 was reduced and adjusted such that the viscosity of the fused resin 209 became 1100 Pa·S again, and the second layer of the outer shell portion was shaped on the first layer of the outer shell portion. Next, the temperature of the heating portion 203 was raised and adjusted such that the viscosity of the fused resin 209 became 500 Pa·S again, the filling portion was formed inside the outer shell portion by relatively scanning the ejection head in a zig-zag manner to fill inside of the frame and form the second unit layer.

The unit layers were deposited in a similar manner up to sixteen layers, and thus a three-dimensionally shaped object was obtained. The obtained three-dimensionally shaped object satisfied the dimensional tolerance shown in FIG. 23.

In addition, the flexural modulus was measured in accordance with "How to obtain plastic flexural property" of JIS K 7171, and a Tabletop Precision Universal Tester AUTOGRAPH AGS-X manufactured by SHIMADZU Corporation was used as a tester.

The three-dimensionally shaped object was formed by changing the viscosity for forming the outer shell portion and the viscosity for forming the filling portion, and conditions with which precision of shape and strength were ensured were obtained. The obtained results are shown in Table 4.

TABLE 4

| Viscosity of filling portion | Viscosity of outer shell portion | | | | | | |
|---|---|---|---|---|---|---|---|
| | 1000 (Comparative example) | 1100 | 1500 | 2000 | 2500 | 3000 | 3500 (Comparative example) |
| 400 (Comparative example) | F | 1.32 | 1.35 | 1.33 | 1.34 | 1.32 | F |
| 500 | F | 1.80 | 1.82 | 1.84 | 1.86 | 1.87 | F |
| 600 | F | 1.83 | 1.83 | 1.85 | 1.80 | 1.82 | F |
| 900 | F | 1.70 | 1.72 | 1.72 | 1.74 | 1.69 | F |
| 1000 | F | 1.69 | 1.72 | 1.71 | 1.71 | 1.73 | F |
| 1100 (Comparative example) | F | 1.22 | 1.23 | 1.23 | 1.21 | 1.20 | F |

In Table 4, the unit of viscosity is Pa·S, and values in the other fields than the fields of viscosity indicate flexural moduli (GPa). In addition, "F" indicates shape defects such as the outer shape being not precise and not satisfying the dimensional tolerance, and the radius of curvature at a corner portion being large and not satisfying the dimensional tolerance.

In the case where the viscosity of the outer shell portion was 1000 Pa·S, the fluidity was large, and thus the shape of the outer shell portion slackened and deviated from the dimensional tolerance. In addition, in the case where the viscosity of the outer shell portion was 3500 Pa·S, the fluidity was small, and thus corner portions could not be precisely shaped and the shape deviated from the dimensional tolerance.

In the case where the viscosity of the filling portion was in the range of 500 Pa·S to 1000 Pa·S, the flexural moduli were stable in the range of 1.69 GPa to 1.87 GPa. However, in the case where the viscosity of the filling portion was 400 Pa·S, thermal degradation of resin became prominent because the temperature of the resin was too high, and thus the flexural moduli dropped to values equal to or smaller than 1.35 GPa. In addition, in the case where the viscosity of the filling portion was 1100 Pa·S, the fluidity decreased and a gap occurred, and thus the flexural moduli dropped to values equal to or smaller than 1.23 GPa.

As described above, preferable results were obtained in the case where the viscosity of the extruded resin material for forming the outer shell portion of the three-dimensionally shaped object was in the range of 1100 Pa·S to 3000 Pa·S and the viscosity of the extruded resin material for forming the filling portion was in the range of 500 Pa·S to 1000 Pa·S.

Example 8

An Example of the fifth exemplary embodiment described with reference to FIG. 21B will be described.

The same three-dimensional shaping apparatus and the same material as Example 7 were used. The relationship between the temperature (° C.) and viscosity (Pa·S) shown in Table 3 was used.

The three-dimensional model 310 having a height of 4.0 mm was divided into sixteen layers, and thus the height of a unit layer was 0.25 mm. The diameter of the ejection port 205 was adjusted such that the extruded resin was deposited to a height of 0.25 mm and a width of 0.5 mm at the time of shaping the outer shell portion.

First, the temperature of the heating portion 203 was adjusted such that the viscosity of the fused resin 209 was 1100 Pa·S, and the outer shell portion of 80 mm×10 mm was shaped. Subsequently, the second layer of the outer shell portion was formed on the first layer of the outer shell portion. Next, the temperature of the heating portion 203 was raised and adjusted such that the viscosity of the fused resin 209 was 500 Pa·S, and the filling portion corresponding to two layers was continuously formed inside the two layers of the outer shell portion. In the formation of the filling portion, the ejection head was relatively scanned in a zig-zag manner such that the fused resin 209 that was extruded filled inside of the frame of the outer shell portion without a gap.

Subsequently, the temperature of the heating portion 203 was reduced and adjusted such that the viscosity of the fused resin 209 became 1100 Pa·S again, and the third and fourth layers of the outer shell portion were shaped on the second layer of the outer shell portion. Next, the temperature of the heating portion 203 was raised and adjusted such that the viscosity of the fused resin 209 became 500 Pa·S again, the filling portion corresponding two layers was continuously formed inside the outer shell portion by relatively scanning the ejection head in a zig-zag manner to fill inside of the frame. Layers were deposited in a similar manner up to the topmost layer, and thus a three-dimensionally shaped object was obtained. The obtained three-dimensionally shaped object satisfied the dimensional tolerance shown in FIG. 23.

The outer shell portion and the filling portion were formed by changing the viscosity of the thermoplastic resin, and the precision of shape and strength of the three-dimensionally shaped object were checked. The measurement of flexural modulus was performed in a similar manner to Example 7. The obtained results are shown in Table 5.

TABLE 5

| Viscosity of filling portion | Viscosity of outer shell portion | | | | | | |
|---|---|---|---|---|---|---|---|
| | 1000 (Comparative example) | 1100 | 1500 | 2000 | 2500 | 3000 | 3500 (Comparative example) |
| 400 (Comparative example) | F | 1.33 | 1.33 | 1.32 | 1.32 | 1.33 | F |
| 500 | F | 1.82 | 1.83 | 1.83 | 1.82 | 1.84 | F |
| 600 | F | 1.80 | 1.82 | 1.84 | 1.81 | 1.81 | F |
| 900 | F | 1.74 | 1.72 | 1.72 | 1.73 | 1.70 | F |
| 1000 | F | 1.70 | 1.70 | 1.69 | 1.72 | 1.71 | F |
| 1100 (Comparative example) | F | 1.21 | 1.22 | 1.21 | 1.22 | 1.20 | F |

In Table 5, the unit of viscosity is Pa·S, and values in the other fields than the fields of viscosity indicate flexural moduli (GPa). In addition, "F" indicates shape defects such as the outer shape being not precise and not satisfying the dimensional tolerance, and the radius of curvature at a corner portion being large and not satisfying the dimensional tolerance.

Similarly to Example 7, in Example 8, preferable results were obtained in the case where the viscosity of the extruded resin material for forming the outer shell portion of the three-dimensionally shaped object was in the range of 1100 Pa·S to 3000 Pa·S and the viscosity of the extruded resin material for forming the filling portion was in the range of 500 Pa·S to 1000 Pa·S.

Example 9

An example of the sixth exemplary embodiment described with reference to FIGS. 22A and 22B will be described.

The same three-dimensional shaping apparatus and the same material as Example 7 were used. The relationship between the temperature (° C.) and viscosity (Pa·S) shown in Table 3 was used.

Although the same three-dimensional model as Example 7 was formed, in contrast to Example 7, the first layer and the sixteenth layer were formed by adjusting the temperature of the heating portion 203 such that the viscosity was 1100 Pa·S. The second to fifteenth layers were formed in the same conditions as Example 7.

The obtained three-dimensionally shaped object satisfied the dimensional tolerance shown in FIG. 23. In addition, the outer surface of the obtained three-dimensionally shaped object had the same surface state on every side, and thus the obtained three-dimensionally shaped object had a uniform appearance.

Example 10

Example 10 is different from Example 7 in that the stage 211 was vibrated by the vibrator 212 when forming the filling portion inside the outer shell portion by relatively scanning the ejection head in a zig-zag manner. The vibration conditions of the vibrator 212 were an amplitude of 2 mm and frequencies of 20 Hz and 240 Hz. The other conditions were the same as Example 7.

Results of the case where the frequency was 20 Hz are shown in Table 6, and results of the case where the frequency was 240 Hz are shown in Table 7. In the tables, the unit of viscosity is Pa·S, and values in the other fields than the fields of viscosity indicate flexural moduli (GPa). In addition, "F" indicates shape defects such as the outer shape being not precise and not satisfying the dimensional tolerance, and the radius of curvature at a corner portion being large and not satisfying the dimensional tolerance.

TABLE 6

Frequency: 20 Hz

| Viscosity of filling portion | Viscosity of outer shell portion | | | | | | |
|---|---|---|---|---|---|---|---|
| | 1000 (Comparative example) | 1100 | 1500 | 2000 | 2500 | 3000 | 3500 (Comparative example) |
| 400 (Comparative example) | F | 1.33 | 1.32 | 1.30 | 1.35 | 1.33 | F |
| 500 | F | 1.89 | 1.85 | 1.89 | 1.90 | 1.87 | F |
| 600 | F | 1.90 | 1.89 | 1.85 | 1.83 | 1.84 | F |
| 900 | F | 1.87 | 1.83 | 1.85 | 1.84 | 1.84 | F |
| 1000 | F | 1.86 | 1.88 | 1.84 | 1.86 | 1.89 | F |
| 1100 (Comparative example) | F | 1.22 | 1.23 | 1.20 | 1.25 | 1.24 | F |

TABLE 7

Frequency: 240 Hz

| Viscosity of filling portion | Viscosity of outer shell portion | | | | | | |
|---|---|---|---|---|---|---|---|
| | 1000 (Comparative example) | 1100 | 1500 | 2000 | 2500 | 3000 | 3500 (Comparative example) |
| 400 (Comparative example) | F | 1.33 | 1.35 | 1.34 | 1.30 | 1.36 | F |
| 500 | F | 1.89 | 1.88 | 1.85 | 1.89 | 1.88 | F |
| 600 | F | 1.95 | 1.93 | 1.94 | 1.95 | 1.93 | F |
| 900 | F | 1.89 | 1.88 | 1.85 | 1.84 | 1.87 | F |
| 1000 | F | 1.90 | 1.88 | 1.88 | 1.88 | 1.85 | F |
| 1100 (Comparative example) | F | 1.23 | 1.25 | 1.24 | 1.22 | 1.22 | F |

When the viscosity of the thermoplastic resin for forming the filling portion was in the range of 500 Pa·S to 1000 Pa·S, the flexural moduli were larger than in Example 7 in both cases where the frequency was 20 Hz and where the frequency was 240 Hz. It is assumed that this is because the filling property of the resin was improved by the vibration. However, when the viscosity of the filling portion was 400 Pa·S, thermal degradation of the resin became prominent, and thus the effect of vibration was not observed. In addition, when the viscosity of the filling portion was 1100 Pa·S, the fluidity was low, and thus the effect of vibration was not observed.

In the cases where the frequency was 20 Hz and where the frequency was 240 Hz, when the viscosity of the thermoplastic resin for forming the filling portion was in the range of 500 Pa·S to 1000 Pa·S, the flexural moduli were stable respectively in the ranges of 1.83 GPa to 1.90 GPa and 1.84 GPa to 1.95 GPa. The improvement of flexural moduli was particularly prominent when the viscosity of the thermoplastic resin for forming the filling portion was in the range of 500 Pa·S to 1000 Pa·S. In contrast, when the viscosity of the thermoplastic resin for forming the filling portion was 400 Pa·S or 1100 Pa·S, the effect of vibration was not observed.

Example 11

Shaping was performed by changing the amplitude in the vibration condition of the vibrator 212 in the range of 0.5 mm to 6 mm. In this example, the frequency was 20 Hz, the viscosity of the resin for forming the outer shell portion was 2000 Pa·S, and the viscosity of the resin for forming the filling portion was 400 Pa·S to 1100 Pa·S.

Obtained results are shown in Table 8. In Table 8, the unit of viscosity is Pa·S, and values in the other fields than the fields of viscosity and amplitude indicate flexural moduli (GPa). In addition, "F" indicates shape defects such as the outer shape being not precise and not satisfying the dimensional tolerance, and the radius of curvature at a corner portion being large and not satisfying the dimensional tolerance. Further, "S" indicates that the shaped object was unintentionally separated from the stage.

Although the flexural moduli were larger than in Example 7 in the case where the amplitude was in the range of 0.5 mm to 5 mm, in the case where the amplitude was 6 mm, the shaped object was unintentionally separated from the stage 211.

TABLE 8

Frequency: 20 Hz, Viscosity of outer shell portion: 2000 Pa · S

| Viscosity of filling portion | Amplitude (mm) | | | | | | |
|---|---|---|---|---|---|---|---|
| | 0.5 | 1 | 2 | 3 | 4 | 5 | 6 |
| 400 (Comparative example) | 1.32 | 1.33 | 1.30 | 1.33 | 1.34 | 1.34 | S |
| 500 | 1.89 | 1.88 | 1.89 | 1.89 | 1.88 | 1.90 | S |
| 600 | 1.84 | 1.84 | 1.85 | 1.88 | 1.89 | 1.90 | S |
| 900 | 1.82 | 1.84 | 1.85 | 1.85 | 1.87 | 1.87 | S |
| 1000 | 1.82 | 1.82 | 1.84 | 1.86 | 1.88 | 1.89 | S |
| 1100 (Comparative example) | 1.19 | 1.21 | 1.20 | 1.21 | 1.22 | 1.23 | S |

Example 12

In Example 12, the three-dimensionally shaped object was formed by using a different thermoplastic resin from Example 7 and using the three-dimensional shaping apparatus of FIG. 20. In Example 12, a PC/ABS polymer alloy T65 manufactured by Bayer was used as the thermoplastic resin.

The material was shaped into a filament having a length of about 100 m and a circular section of Φ=1.75 mm by using a single-screw extruder UT-25-TL manufactured by Research Laboratory of Plastics Technology Co., Ltd. that is not illustrated with a number of screw rotations of 50 rpm, at a cylinder temperature of 212° C., and with a resin pressure of 5.1 MPa.

Also in Example 12, a relationship between temperature (° C.) and viscosity (Pa·S) of the ABS resin to be used was obtained. The measurement was performed in accordance with "Test method of fluidity property of plastic by plastic-capillary rheometer and slit die rheometer" of JIS K 7199. The shear rate was set to 100 (1/s) in the measurement. The results of the measurement are shown in FIG. 25.

Next, shaping of the three-dimensional model 310 illustrated in FIG. 23 was performed by using the three-dimensional shaping apparatus of FIG. 20. The outer shell portion was formed by using the ejection head 206A, and the filling portion was formed by using the ejection head 206B. The shape of the three-dimensional shaping model is the same as Example 7.

The outer shell portion and the filling portion were formed by changing the viscosity of the thermoplastic resin, and the precision of shape and strength of the three-dimensionally shaped object were checked.

Figure 25:
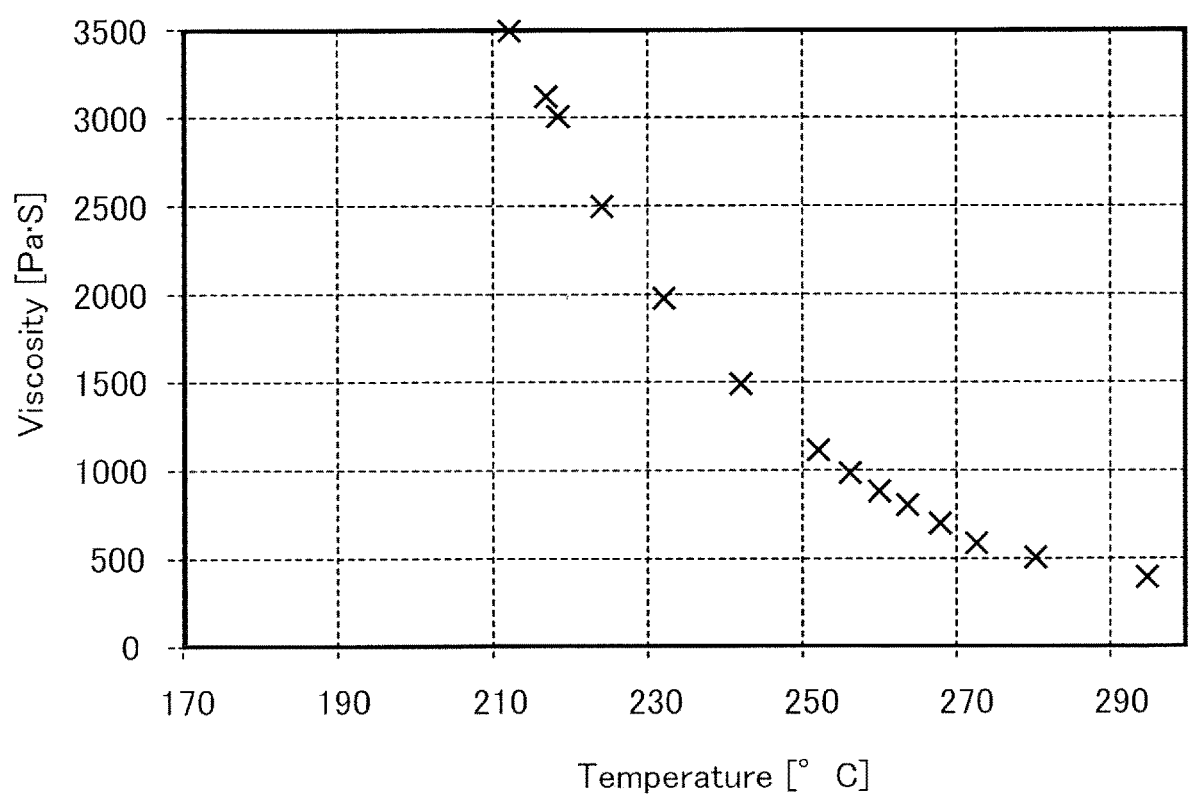
FIG. 25 is a graph illustrating a temperature-viscosity characteristic of a thermoplastic resin of an example.

The viscosities of thermoplastic resin for forming the outer shell portion and the filling portion were set in accordance with the relationship between temperature (° C.) and viscosity (Pa·S) of the PC/ABS resin illustrated in FIG. 25. The temperature sensors 207A and 207B each measured the temperature of fused resin ejected through the corresponding ejection head, and feedback control of the heating portions 203A and 203B was performed. Set values are shown in Table 9.

TABLE 9

| Viscosity (Pa · S) | 400 | 500 | 600 | 900 | 1000 | 1100 |
|---|---|---|---|---|---|---|
| Temperature (° C.) | 295 | 280 | 272 | 260 | 256 | 252 |
| Viscosity (Pa · S) | 1500 | 2000 | 2500 | 3000 | 3500 | |
| Temperature (° C.) | 242 | 232 | 224 | 219 | 212 | |

The three-dimensional model 310 having a height of 4.0 mm was divided into sixteen layers, and thus the height of a unit layer was 0.25 mm. The diameter of the ejection port 205A was adjusted such that the extruded resin was deposited to a height of 0.25 mm and a width of 0.5 mm at the time of shaping the outer shell portion.

First, the temperature of the heating portion 203A was adjusted such that the viscosity of the fused resin was 1100 Pa·S, and the outer shell portion of 80 mm×10 mm was shaped by using the ejection head 206A. Next, the temperature of the heating portion 203B was adjusted such that the viscosity of the fused resin was 500 Pa·S, and the filling portion was continuously formed inside the outer shell portion by relatively scanning the ejection head 206B in a zig-zag manner such that the fused resin filled inside of the frame of the outer shell portion to form a unit layer without a gap.

Unit layers were deposited in a similar manner up to sixteen layers, and thus a three-dimensionally shaped object was obtained. The obtained three-dimensionally shaped object satisfied the dimensional tolerance shown in FIG. 23. The measurement of flexural modulus was performed in a similar manner to Example 7.

The three-dimensionally shaped object was formed by changing the viscosity for forming the outer shell portion and the viscosity for forming the filling portion, and conditions with which precision of shape and strength were ensured were obtained. The obtained results are shown in Table 10.

TABLE 10

| | Viscosity of outer shell portion | | | | | | |
|---|---|---|---|---|---|---|---|
| Viscosity of filling portion | 1000 (Comparative example) | 1100 | 1500 | 2000 | 2500 | 3000 | 3500 (Comparative example) |
| 400 (Comparative example) | F | 1.62 | 1.64 | 1.63 | 1.65 | 1.66 | F |
| 500 | F | 2.20 | 2.25 | 2.24 | 2.24 | 2.23 | F |
| 600 | F | 2.18 | 2.20 | 2.23 | 2.23 | 2.18 | F |
| 900 | F | 2.08 | 2.10 | 2.11 | 2.13 | 2.09 | F |
| 1000 | F | 2.07 | 2.06 | 2.08 | 2.12 | 2.10 | F |
| 1100 (Comparative example) | F | 1.50 | 1.52 | 1.51 | 1.49 | 1.53 | F |

In Table 10, the unit of viscosity is Pa·S, and values in the other fields than the fields of viscosity indicate flexural moduli (GPa). In addition, "F" indicates shape defects such as the outer shape being not precise and not satisfying the dimensional tolerance, and the radius of curvature at a corner portion being large and not satisfying the dimensional tolerance.

The results of Table 10 indicate that, in the case where the viscosity of the thermoplastic resin for forming the outer shell portion was 1000 Pa·S, the fluidity was large, and thus the shape of the outer shell portion slackened and deviated from the dimensional tolerance. In addition, in the case where the viscosity was 3500 Pa·S, the fluidity was small, and thus corner portions could not be precisely shaped and the shape deviated from the dimensional tolerance.

In the case where the viscosity of the thermoplastic resin for forming the filling portion was in the range of 500 Pa·S to 1000 Pa·S, the flexural moduli were in the range of 2.06 GPa to 2.25 GPa. In the case where the viscosity of the thermoplastic resin for forming the filling portion was 400 Pa·S, thermal degradation of resin became prominent because the temperature of the resin was too high, and thus the flexural moduli dropped to values around 1.6 GPa. In addition, in the case where the viscosity of the thermoplastic resin for forming the filling portion was 1100 Pa·S, the fluidity decreased and a gap occurred, and thus the flexural moduli dropped to values around 1.5 GPa.

Example 13

A case of improvement of Example 12 will be described as Example 13. In Example 13, the stage 211 was vibrated by the vibrator 212 when forming the filling portion inside the outer shell portion by scanning the ejection head in a zig-zag manner. The vibration conditions of the vibrator 212 were an amplitude of 2 mm and frequencies of 20 Hz and 240 Hz. The other conditions were the same as Example 12.

Results of the case where the frequency was 20 Hz are shown in Table 11, and results of the case where the frequency was 240 Hz are shown in Table 12.

TABLE 11

Frequency: 20 Hz

| Viscosity of filling portion | Viscosity of outer shell portion | | | | | | |
|---|---|---|---|---|---|---|---|
| | 1000 (Comparative example) | 1100 | 1500 | 2000 | 2500 | 3000 | 3500 (Comparative example) |
| 400 (Comparative example) | F | 1.60 | 1.62 | 1.61 | 1.63 | 1.63 | F |
| 500 | F | 2.21 | 2.22 | 2.25 | 2.25 | 2.23 | F |
| 600 | F | 2.24 | 2.20 | 2.22 | 2.23 | 2.24 | F |
| 900 | F | 2.24 | 2.20 | 2.23 | 2.23 | 2.25 | F |
| 1000 | F | 2.24 | 2.26 | 2.24 | 2.22 | 2.24 | F |
| 1100 (Comparative example) | F | 1.52 | 1.52 | 1.53 | 1.54 | 1.51 | F |

TABLE 12

Frequency: 240 Hz

| Viscosity of filling portion | Viscosity of outer shell portion | | | | | | |
|---|---|---|---|---|---|---|---|
| | 1000 (Comparative example) | 1100 | 1500 | 2000 | 2500 | 3000 | 3500 (Comparative example) |
| 400 (Comparative example) | F | 1.61 | 1.62 | 1.60 | 1.60 | 1.62 | F |
| 500 | F | 2.25 | 2.27 | 2.24 | 2.24 | 2.28 | F |
| 600 | F | 2.22 | 2.25 | 2.23 | 2.24 | 2.25 | F |
| 900 | F | 2.23 | 2.23 | 2.25 | 2.20 | 2.24 | F |
| 1000 | F | 2.25 | 2.26 | 2.22 | 2.24 | 2.24 | F |
| 1100 (Comparative example) | F | 1.53 | 1.55 | 1.58 | 1.54 | 1.50 | F |

In Tables 11 and 12, values in the other fields than the fields of viscosity indicate flexural moduli (GPa). In addition, "F" indicates shape defects such as the outer shape being not precise and not satisfying the dimensional tolerance, and the radius of curvature at a corner portion being large and not satisfying the dimensional tolerance.

The results of Tables 11 and 12 indicate that, in either case, when the viscosity of the thermoplastic resin for forming the outer shell portion was 1000 Pa·S, the fluidity was large, and thus the shape of the outer shell portion slackened and deviated from the dimensional tolerance. In addition, in the case where the viscosity of the thermoplastic resin for forming the outer shell portion was 3500 Pa·S, the fluidity was small, and thus corner portions could not be precisely shaped and the shape deviated from the dimensional tolerance.

In the case where the frequency of vibration of the vibrator 212 was 20 Hz, when the viscosity of the thermoplastic resin for forming the filling portion was in the range of 500 Pa·S to 1000 Pa·S, the flexural moduli were in the range of 2.20 GPa to 2.26 GPa. In the case where the frequency of vibration of the vibrator 212 was 240 Hz, when the viscosity of the thermoplastic resin for forming the filling portion was in the range of 500 Pa·S to 1000 Pa·S, the flexural moduli were in the range of 2.20 GPa to 2.27 GPa. In the case where the viscosity of the thermoplastic resin for forming the filling portion was 400 Pa·S, thermal degradation of resin became prominent because the temperature of the resin was too high, and thus the flexural moduli dropped to values around 1.6 GPa. In addition, in the case where the viscosity of the thermoplastic resin for forming the filling portion was 1100 Pa·S, the fluidity decreased and a gap occurred, and thus the flexural moduli dropped to values around 1.5 GPa.

The improvement of flexural moduli was particularly prominent when the viscosity of the thermoplastic resin for forming the filling portion was in the range of 500 Pa·S to 1000 Pa·S in both cases where the frequency of vibration of the vibrator 212 was 20 Hz and where the frequency of vibration of the vibrator 212 was 240 Hz.

In contrast, when the viscosity of the thermoplastic resin for forming the filling portion was 400 Pa·S or 1100 Pa·S, the effect of vibration was not observed.

Example 14

As Example 14, an example in which three-dimensional shaping was performed by using the three-dimensional shaping apparatus of FIG. 20 and supplying different kinds of thermoplastic resins to the ejection heads 206A and 206B will be described.

Three-dimensional shaping was performed by using a PC/ABS polymer alloy T65 manufactured by Bayer as the shaping material 201A, and an ABS resin 3001 M manufactured by UMG ABS, LTD. as the shaping material 201B.

First, the temperature of the heating portion 203A was adjusted such that the viscosity of the shaping material 201A was 1100 Pa·S, and the outer shell portion of 80 mm×10 mm was shaped by using the ejection head 206A. Next, the temperature of the heating portion 203B was adjusted such that the viscosity of the shaping material 201B was 500 Pa·S, and the filling portion was continuously formed inside the outer shell portion by relatively scanning the ejection head 206B in a zig-zag manner such that the shaping material 201B filled inside of the frame of the outer shell portion to form a unit layer without a gap.

Layers were deposited in a similar manner up to the topmost layer, and thus a three-dimensionally shaped object was obtained. The obtained three-dimensionally shaped object satisfied the dimensional tolerance shown in FIG. 23.

The three-dimensionally shaped object was formed by changing the viscosity for forming the outer shell portion and the viscosity for forming the filling portion, and conditions with which precision of shape and strength were ensured were obtained. The obtained results are shown in Table 13.

TABLE 13

| Viscosity of filling portion | Viscosity of outer shell portion | | | | | | |
|---|---|---|---|---|---|---|---|
| | 1000 (Comparative example) | 1100 | 1500 | 2000 | 2500 | 3000 | 3500 (Comparative example) |
| 400 (Comparative example) | F | 1.42 | 1.43 | 1.44 | 1.42 | 1.41 | F |
| 500 | F | 1.93 | 1.95 | 1.94 | 1.93 | 1.92 | F |
| 600 | F | 1.90 | 1.89 | 1.88 | 1.88 | 1.87 | F |
| 900 | F | 1.85 | 1.82 | 1.83 | 1.82 | 1.82 | F |
| 1000 | F | 1.80 | 1.83 | 1.84 | 1.82 | 1.83 | F |
| 1100 (Comparative example) | F | 1.34 | 1.33 | 1.32 | 1.31 | 1.31 | F |

In Table 13, values in the other fields than the fields of viscosity indicate flexural moduli (GPa). In addition, "F" indicates shape defects such as the outer shape being not precise and not satisfying the dimensional tolerance, and the radius of curvature at a corner portion being large and not satisfying the dimensional tolerance.

The results of Table 13 indicate that, when the viscosity of the thermoplastic resin for forming the outer shell portion was 1000 Pa·S, the fluidity was large, and thus the shape of the outer shell portion slackened and deviated from the dimensional tolerance. In addition, in the case where the viscosity of the thermoplastic resin for forming the outer shell portion was 3500 Pa·S, the fluidity was small, and thus corner portions could not be precisely shaped and the shape deviated from the dimensional tolerance.

In the case where the viscosity of the filling portion was in the range of 500 Pa·S to 1000 Pa·S, the flexural moduli were in the range of 1.80 GPa to 1.95 GPa. In the case where the viscosity of the filling portion was 400 Pa·S, thermal degradation of resin became prominent because the temperature of the resin was too high, and thus the flexural moduli dropped to values around 1.4 GPa. In addition, in the case where the viscosity of the thermoplastic resin for forming the filling portion was 1100 Pa·S, the fluidity decreased and a gap occurred, and thus the flexural moduli dropped to values around 1.3 GPa.

As indicated by Examples described above, it is preferable that the viscosity of the resin material for forming the outer shell portion of the three-dimensionally shaped object at the time of extrusion is in the range of 1100 Pa·S to 3000 Pa·S and the viscosity of the resin material for forming the filling portion at the time of extrusion is in the range of 500 Pa·S to 1000 Pa·S.

In addition, it is preferable that the shaping stage is vibrated when forming the filling portion. It is preferable that the amplitude of the vibration is set to an appropriate value in accordance with the shaped object to be formed.

In addition, similar results were obtained also in the case where the step of forming the filling portion after forming plural layers of the outer shell portion was repeated.

Forming the whole surface of the three-dimensionally shaped object from a thermoplastic resin having a viscosity of 1100 Pa·S to 3000 Pa·S at the time of extrusion has a merit that a shaped object having a uniform appearance can be obtained.

In addition, in the case where plural ejection heads were provided to eject resins of different viscosities, the necessity of changing the temperature of the resin for changing the viscosity was eliminated, and thus the time required for shaping was shortened compared with the case where a single ejection head was used. In addition, by ejecting different materials through two systems, the outer shell portion and the filling portion can be formed from different materials.

According to the exemplary embodiments of the present invention described above, occurrence of a gap between layers of deposited material can be suppressed in fused deposition modeling, and a three-dimensionally shaped object having a high strength can be formed with a high precision of shape.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-209782, filed Oct. 26, 2016, Japanese Patent Application No. 2016-226042, filed Nov. 21, 2016 and Japanese Patent Application No. 2017-156168, filed Aug. 10, 2017, which are hereby incorporated by reference herein in their entirety.

What is claimed is:

1. A method of producing a three-dimensionally shaped object, the method comprising:
a wall formation step of forming a wall by ejecting, from an ejection portion, a first fused thermoplastic resin onto a base stage while relatively moving the ejection portion with respect to the base stage to provide a space surrounded by the wall in a horizontal direction and open in an upward direction; and
an injection step of ejecting, from the ejection portion, a second fused thermoplastic resin under a controlled injection pressure from above the space so as to inject the second fused thermoplastic resin into the space,
wherein a viscosity of the second fused thermoplastic resin being ejected is lower than a viscosity of the first fused thermoplastic resin being ejected, and
wherein, in the injection step, a distal end surface of the ejection portion covers the space by coming into contact with a top surface of the wall, and a contact pressure equal to or larger than the injection pressure is applied between the distal end surface of the ejection portion and the top surface of the wall to improve a sealing property therebetween.

2. The method according to claim 1,
wherein the wall formation step is a step of forming the wall such that a plurality of the spaces each surrounded by the wall in the horizontal direction and open in the upward direction are provided, and
wherein the injection step is a step of sequentially performing said injecting of the second fused thermoplastic resin into each one of the plural spaces.

3. The method according to claim 1, wherein the ejection portion comprises an ejection nozzle comprising the distal end surface provided with an air exhausting structure thereon, and
wherein, in the injection step, the second fused thermoplastic resin is injected into the space by using the ejection nozzle.

4. The method according to claim 1,
wherein the ejection portion comprises plural ejection nozzles, and
wherein, in the injection step, the second fused thermoplastic resin is ejected by using an ejection nozzle different from an ejection nozzle used in the wall formation step to eject the first fused thermoplastic resin, the different ejection nozzle comprising the distal end surface.

5. The method according to claim 1, further comprising:
a step of storing, in a storage device, a three-dimensional model to be shaped;
a step of generating, by a computer, a framework portion model and a filling portion model based on the three-dimensional model;
a step of generating, by the computer and based on the framework portion model, a set of instructions for executing the wall formation step; and
a step of generating, by the computer and based on the filling portion model, a set of instructions for executing the injection step.

6. The method according to claim 1, wherein the wall formation step is a step of forming the wall by ejecting, from the ejection portion, the first fused thermoplastic resin having a viscosity of 1100 Pa·S to 3000 Pa·S, and
wherein the injection step is a step of ejecting, from the ejection portion, and injecting, into the space, the second fused thermoplastic resin having a viscosity of 500 Pa·S to 1000 Pa·S.

7. The method according to claim 1, wherein the wall formation step is a step of forming a portion constituting a surface of the three-dimensionally shaped object, and
wherein the injection step is a step of forming a filling portion of the three-dimensionally shaped object that is adjacent to the portion formed in the wall formation step.

8. The method according to claim 1, wherein a temperature of the first fused thermoplastic resin ejected in the wall formation step is lower than a temperature of the second fused thermoplastic resin ejected in the injection step.

9. The method according to claim 1, wherein the base stage is vibrated in the injection step.

10. The method according to claim 1, wherein the contact pressure is selected so as not to deform the wall.

11. The method according to claim 1, wherein the injection pressure is controlled so that the wall and the second fused thermoplastic resin are interconnected without any gap therebetween.

12. The method according to claim 1,
wherein, in the wall formation step, recess portions are formed between layers of the first fused thermoplastic resin forming the wall, and
wherein, in the injection step, the injection pressure is controlled so that the second fused thermoplastic resin fills the recess portions, thereby anchoring the second fused thermoplastic resin with the wall.

* * * * *